(12) United States Patent
Huang et al.

(10) Patent No.: US 12,388,265 B2
(45) Date of Patent: Aug. 12, 2025

(54) POWER SYSTEM AND CONTROL METHOD FOR POWER SYSTEM

(71) Applicant: Huawei Digital Power Technologies Co., Ltd., Shenzhen (CN)

(72) Inventors: Liuliu Huang, Shanghai (CN); Lin Li, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/585,771

(22) Filed: Feb. 23, 2024

(65) Prior Publication Data

US 2024/0250535 A1    Jul. 25, 2024

Related U.S. Application Data

(63) Continuation of application No. PCT/CN2021/114791, filed on Aug. 26, 2021.

(51) Int. Cl.
*H02J 3/32*    (2006.01)
*H02J 3/46*    (2006.01)

(52) U.S. Cl.
CPC ................ *H02J 3/32* (2013.01); *H02J 3/46* (2013.01); *H02J 2300/24* (2020.01)

(58) Field of Classification Search
CPC ............. H02J 3/32; H02J 3/46; H02J 2300/24
See application file for complete search history.

(56) References Cited

U.S. PATENT DOCUMENTS 9,627,907 B2    4/2017    Ohashi et al.
10,205,335 B2    2/2019    Sakata et al.

FOREIGN PATENT DOCUMENTS

| CN | 105226632 A | 1/2016 |
| CN | 110224422 A | 9/2019 |
| CN | 113300398 A | 8/2021 |
| WO | 2020163912 A1 | 8/2020 |

*Primary Examiner* — Robert L Deberadinis
(74) *Attorney, Agent, or Firm* — Conley Rose, P.C.

(57) ABSTRACT

N direct current coupling units are configured to provide electric energy to a load. Each of the N direct current coupling units includes an energy storage unit. The energy storage unit is configured to store electric energy or supply power to the load. Herein, N is a positive integer. A primary controller is configured to determine an expected discharge power value of energy storage units in the N direct current coupling units, where the expected discharge power value is a power value that indicates power that needs to be discharged by the energy storage units in the N direct current coupling units, and determine actual discharge power of the energy storage unit in each direct current coupling unit based on the expected discharge power value and first characteristic information of the energy storage unit in the direct current coupling unit.

20 Claims, 9 Drawing Sheets

POWER SYSTEM AND CONTROL METHOD FOR POWER SYSTEM

CROSS-REFERENCE TO RELATED APPLICATIONS

This is a continuation of International Patent Application No. PCT/CN2021/114791 filed on Aug. 26, 2021, which is hereby incorporated by reference in its entirety.

TECHNICAL FIELD

This application relates to the field of power systems, and in particular, to a power system and a control method for a power system.

BACKGROUND

A power system may include a power generation system and an energy storage system. The power generation system may output electric energy for use by a local load, or may provide converted electric energy to the energy storage system for storage, or provide electric energy to a power grid. In an application scenario of the power system, electric energy output by a power supply system meets requirements of the local load and the energy storage system, and then electric energy is provided to the power grid, to increase a self-generation and self-consumption rate and reduce impact on the power grid.

In a process of outputting or inputting electric energy in the power system, real-time charging/discharging capability information of each component in the power system is not considered, which is likely to cause improper allocation of electric energy to some components in the power system. Consequently, a service life of a key component in the power system is affected, and reliability of the power system is reduced. Therefore, a power system and a control method for a power system are urgently needed, to improve running reliability of the power system.

SUMMARY

This application provides a control method for a power system, so that real-time charging/discharging capability information of each component in a power system can be considered in a process of outputting or inputting electric energy in the power system, to implement proper allocation of electric energy to some components in the power system, so as to improve running reliability of the power system.

According to a first aspect, a power system is provided. The power system includes a primary controller and N direct current coupling units. The N direct current coupling units are configured to provide electric energy to a load. Each of the N direct current coupling units includes an energy storage unit. The energy storage unit is configured to store electric energy or provide electric energy to the load. Herein, N is a positive integer. The primary controller is configured to determine an expected discharge power value of energy storage units in the N direct current coupling units, where the expected discharge power value is a power value that is determined by the primary controller and that indicates power that needs to be discharged by the energy storage units in the N direct current coupling units, and determine actual discharge power of the energy storage unit in each direct current coupling unit based on the expected discharge power value and first characteristic information of the energy storage unit in the direct current coupling unit, where the first characteristic information indicates a real-time charging/discharging capability of the energy storage unit in each direct current coupling unit, and the actual discharge power is discharge power allocated to the energy storage unit in each direct current coupling unit.

According to the solution in this application, the primary controller in the power system may obtain the power value that currently indicates power that needs to be discharged by the energy storage units in the N direct current coupling units, namely, the expected discharge power value of the energy storage units, and the primary controller allocates the actual discharge power of the energy storage unit to each direct current coupling unit based on the expected discharge power value of the energy storage units. In this process, the real-time charging/discharging capability of the energy storage unit in each direct current coupling unit is considered, and the actual discharge power of the energy storage unit in each direct current coupling unit is properly allocated. In this way, a life cycle of a power device in the power system can be extended, and running reliability of the power system can be improved.

With reference to the first aspect, in some implementations of the first aspect, the first characteristic information is represented by at least one of the following parameters: a state of charge (SOC) of an energy storage battery in the energy storage unit, a state of health (SOH) of the energy storage battery, and a capacity of the energy storage battery.

With reference to the first aspect, in some implementations of the first aspect, the primary controller is further configured to determine theoretical discharge power of the energy storage unit in each direct current coupling unit based on the expected discharge power value and the first characteristic information of the energy storage unit in the direct current coupling unit, obtain a discharge power limit of each direct current coupling unit, where the discharge power limit is a limit of power that can be output by the energy storage unit in each direct current coupling unit, and determine actual discharge power of each direct current coupling unit based on the theoretical discharge power and the discharge power limit.

With reference to the first aspect, in some implementations of the first aspect, the primary controller is further configured to determine the theoretical discharge power of the energy storage unit based on the following formula:

$$P_{bat\_discharge\_1\_i} = P_{bat\_discharge\_sum} \frac{(1-SOC_i) \cdot SOH_i \cdot CAPACITY_i}{\sum (1-SOC_i) \cdot SOH_i \cdot CAPACITY_i},$$

where $P_{bat\_discharge\_1\_i}$ represents theoretical discharging power of an energy storage unit in an $i^{th}$ direct current coupling unit in the N direct current coupling units, $P_{bat\_discharge\_sum}$ represents an expected discharging power value of the energy storage units in the N direct current coupling units, $SOC_i$ represents an SOC of an energy storage battery in the energy storage unit in the $i^{th}$ direct current coupling unit, $SOH_i$ represents an SOH of the energy storage battery in the $i^{th}$ direct current coupling unit, $CAPACITY_i$ represents a capacity of the energy storage battery in the $i^{th}$ direct current coupling unit, and $1 \leq i \leq N$.

With reference to the first aspect, in some implementations of the first aspect, each direct current coupling unit further includes an energy unit, the energy unit is configured to generate electric energy, and the primary controller is further configured to determine that a sum of maximum discharge power of energy units in all the direct current coupling units is less than required power of the load, and determine to allocate the expected discharge power value to the energy storage units in the N direct current coupling units.

With reference to the first aspect, in some implementations of the first aspect, each direct current coupling unit further includes an inverter unit, the inverter unit is configured to receive, through a direct current bus, electric energy output by the energy storage unit, and provide electric energy to the load after performing direct current-to-alternating current conversion on the electric energy, and the primary controller is further configured to determine a smallest value in the following parameters as the actual discharge power of each direct current coupling unit: the theoretical discharge power of the energy storage unit in each direct current coupling unit, the discharge power limit of each direct current coupling unit, and a first power value of each direct current coupling unit, where the first power value is a maximum value of power that can be output by the inverter unit in each direct current coupling unit.

With reference to the first aspect, in some implementations of the first aspect, the primary controller is configured to allocate theoretical discharge power to M of the N direct current coupling units, where the M direct current coupling units are all or some of the N direct current coupling units, and the primary controller is further configured to perform a plurality of rounds of iterative calculation, to determine actual discharge power of each of the M direct current coupling units, where each of the plurality of rounds of iterative calculation includes determining N1 first direct current coupling units, where the first direct current coupling unit is a direct current coupling unit whose theoretical discharge power is greater than a discharge power limit in the M direct current coupling units, N1 is a positive integer, and 0<N1≤M, determining that discharge power limits of the N1 first direct current coupling units are actual discharge power of the N1 first direct current coupling units, determining, by the primary controller, that the expected discharge power value of the energy storage units in the N direct current coupling units is decreased by a sum of actual discharge power of energy storage units in the N1 first direct current coupling units, and determining, by the primary controller, to allocate actual discharge power to an energy storage unit in a second direct current coupling unit, where the second direct current coupling unit includes a direct current coupling unit to which no actual discharge power is allocated in the M direct current coupling units.

With reference to the first aspect, in some implementations of the first aspect, the primary controller is further configured to determine that theoretical discharge power values of all of the M direct current coupling units are less than discharge power limits corresponding to the M direct current coupling units, and determine that actual discharge power of the M direct current coupling units is the theoretical discharge power corresponding to the M direct current coupling units.

According to a second aspect, a power system is provided. The power system includes a primary controller and N direct current coupling units. The N direct current coupling units are configured to provide electric energy to a load. Each of the N direct current coupling units includes an energy storage unit. The energy storage unit is configured to store electric energy. Herein, N is a positive integer. The primary controller is configured to determine an expected charging power value of energy storage units in the N direct current coupling units, where the expected charging power value is a charging power value that is determined by the primary controller and that can be provided to the energy storage units in the N direct current coupling units, and determine actual charging power of the energy storage unit in each direct current coupling unit based on the expected charging power value and first characteristic information of the energy storage unit in the direct current coupling unit, where the first characteristic information indicates a real-time charging/discharging capability of the energy storage unit in each direct current coupling unit, and the actual charging power is charging power allocated to the energy storage unit in each direct current coupling unit.

With reference to the second aspect, in some implementations of the second aspect, the first characteristic information is represented by at least one of the following parameters: an SOC of an energy storage battery in the energy storage unit, an SOH of the energy storage battery, and a capacity of the energy storage battery.

With reference to the second aspect, in some implementations of the second aspect, the primary controller is further configured to determine theoretical charging power of the energy storage unit in each direct current coupling unit based on the expected charging power value and the first characteristic information of the energy storage unit in the direct current coupling unit, obtain a charging power limit of each direct current coupling unit, where the charging power limit is a limit of power that can be input to the energy storage unit in each direct current coupling unit, and determine actual charging power of each direct current coupling unit based on the theoretical charging power and the charging power limit.

With reference to the second aspect, in some implementations of the second aspect, the primary controller is further configured to determine the theoretical charging power of the energy storage unit based on the following formula:

$$P_{bat\_charge\_1\_i} = P_{bat\_charge\_sum} \frac{(1 - SOC_i) \cdot SOH_i \cdot CAPACITY_i}{\sum (1 - SOC_i) \cdot SOH_i \cdot CAPACITY_i},$$

where $P_{bat\_charge\_1\_i}$ represents theoretical charging power of an energy storage unit in an $i^{th}$ direct current coupling unit in the N direct current coupling units, $P_{bat\_charge\_sum}$ represents the expected charging power value of the energy storage units in the N direct current coupling units, $SOC_i$ represents an SOC of an energy storage battery in the energy storage unit in the $i^{th}$ direct current coupling unit, $SOH_i$ represents an SOH of the energy storage battery in the $i^{th}$ direct current coupling unit, $CAPACITY_i$ represents a capacity of the energy storage battery in the $i^{th}$ direct current coupling unit, and $1 \le i \le N$.

With reference to the second aspect, in some implementations of the second aspect, each direct current coupling unit further includes an energy unit, the energy unit is configured to generate electric energy, and the primary controller is further configured to determine that a sum of maximum discharge power of energy units in all the direct current coupling units is greater than required power of the load, and is less than a sum of the required power of the load and required charging power of the energy storage units in all the direct current coupling units, and determine to allocate the expected charging power value to the energy storage units in the N direct current coupling units.

With reference to the second aspect, in some implementations of the second aspect, each direct current coupling unit further includes an inverter unit, the inverter unit is used for the energy storage unit to absorb electric energy, and the primary controller is further configured to determine a smallest value in the following parameters as the actual charging power of each direct current coupling unit: a theoretical charging power value of each direct current coupling unit, the charging power limit of each direct current coupling unit, and a second power value of each direct current coupling unit, where the second power value is a maximum value of power that can be input to the inverter unit in each direct current coupling unit.

With reference to the second aspect, in some implementations of the second aspect, the primary controller is further configured to perform a plurality of rounds of iterative calculation, to determine actual charging power of each of M direct current coupling units, where each of the plurality of rounds of iterative calculation includes determining N1 first direct current coupling units, where the first direct current coupling unit is a direct current coupling unit whose theoretical charging power is greater than a charging power limit in the M direct current coupling units, N1 is a positive integer, and 0<N1≤M, determining that actual charging power of the N1 first direct current coupling units is charging power limits of the N1 first direct current coupling units, determining that the expected charging power value of the energy storage units in the N direct current coupling units is decreased by a sum of actual charging power energy storage units in the N1 first direct current coupling units, and determining to allocate actual discharge power to an energy storage unit in a second direct current coupling unit, where the second direct current coupling unit includes a direct current coupling unit to which no actual discharge power is allocated in the M direct current coupling units.

With reference to the second aspect, in some implementations of the second aspect, the primary controller is further configured to determine that theoretical charging power values of all of the M direct current coupling units are less than charging power limits corresponding to the M direct current coupling units, and determine that actual charging power of the M direct current coupling units is theoretical charging power corresponding to the M direct current coupling units.

According to a third aspect, a power system is provided. The power system includes a primary controller and N direct current coupling units. The N direct current coupling units are configured to supply power to a load and a power grid. Each of the N direct current coupling units includes an energy unit, an energy storage unit, and an inverter unit. The energy unit is configured to generate electric energy. The energy storage unit is configured to store the electric energy generated by the energy unit. The inverter unit is configured to receive, through a direct current bus, electric energy output by the energy unit, and provide electric energy to the load and the power grid after performing direct current-to-alternating current conversion on the electric energy. Herein, N is a positive integer. The primary controller is configured to determine remaining power of the energy unit in each of the N direct current coupling units, where the remaining power includes power remaining after each direct current coupling unit provides electric energy to the energy storage unit and the load, obtain an output power limit of each direct current coupling unit, where the output power limit is a limit of power that can be output by the inverter unit in each direct current coupling unit, and determine a surplus power on-grid power reference value of each direct current coupling unit based on the remaining power and the output power limit, where surplus power on-grid power is power that is allocated by the energy unit in each direct current coupling unit and that is to be provided to the power grid.

With reference to the third aspect, in some implementations of the third aspect, the primary controller is further configured to determine a surplus power on-grid capability reference value of each direct current coupling unit based on the remaining power and the output power limit, where the surplus power on-grid capability reference value indicates a maximum value of power that can be output by each direct current coupling unit to the power grid, and determine the surplus power on-grid power reference value of each direct current coupling unit based on the surplus power on-grid capability reference value and a limit of power that can be received by the power grid.

With reference to the third aspect, in some implementations of the third aspect, the primary controller is further configured to determine a smallest value in the following parameters as the surplus power on-grid capability reference value of each direct current coupling unit: the remaining power of the energy unit in each direct current coupling unit and the output power limit of each direct current coupling unit.

With reference to the third aspect, in some implementations of the third aspect, the primary controller is further configured to determine the surplus power on-grid power reference value of each direct current coupling unit based on the following formula:

$$P_{on\_grid\_ref\_i} = \min\left(P_{on\_grid\_lmt}\frac{P_{on\_grid\_i}}{\sum P_{on\_grid\_i}}, P_{on\_grid\_i}\right)$$

where $P_{on\_grid\_ref\_i}$ represents a surplus power on-grid power reference value of an $i^{th}$ direct current coupling unit in the N direct current coupling units, $P_{on\_grid\_i}$ represents a surplus power on-grid capability reference value, $P_{on\_grid\_lmt}$ represents the limit of power that can be received by the power grid, $\Sigma P_{on\_grid\_i}$ represents a sum of surplus power on-grid capability reference values of the N direct current coupling units, and 1≤i≤N.

With reference to the third aspect, in some implementations of the third aspect, the primary controller is further configured to determine that maximum discharge power of energy units in the N direct current coupling units is greater than a sum of required power of the load and required charging power of energy storage units in all the direct current coupling units, and determine that actual charging power allocated to the energy storage unit in each of the N direct current coupling units is a charging power limit of the energy storage unit, where the actual charging power is charging power allocated to the energy storage unit in each direct current coupling unit.

With reference to the third aspect, in some implementations of the third aspect, the primary controller is further configured to determine power output by the energy unit in each direct current coupling unit to the load, and determine that power remaining after the energy unit in each direct current coupling unit outputs the actual charging power to the energy storage unit and outputs the power to the load is the remaining power of the energy unit in each direct current coupling unit.

With reference to the third aspect, in some implementations of the third aspect, the primary controller is further configured to determine remaining power of a second direct current coupling unit, where the second direct current coupling unit is a direct current coupling unit, in the N direct current coupling units, whose remaining power is greater than 0 after the energy unit outputs power to the energy storage unit and the load, and determine that the remaining power of the second direct current coupling unit is power remaining after the energy unit outputs power to the energy storage unit, the load, and a first direct current coupling unit, where the first direct current coupling unit includes a direct current coupling unit, in the N direct current coupling units, whose remaining power is less than 0 after the energy unit outputs power to the energy storage unit and the load.

According to a fourth aspect, a control method for a power system is provided. The power system includes a primary controller and N direct current coupling units. The N direct current coupling units are configured to provide electric energy to a load. Each of the N direct current coupling units includes an energy storage unit. The energy storage unit is configured to store electric energy or provide electric energy to the load. Herein, N is a positive integer. The method includes the following. The primary controller determines an expected discharge power value of energy storage units in the N direct current coupling units, where the expected discharge power value is a power value that is determined by the primary controller and that indicates power that needs to be discharged by the energy storage units in the N direct current coupling units, and the primary controller determines actual discharge power of the energy storage unit in each direct current coupling unit based on the expected discharge power value and first characteristic information of the energy storage unit in the direct current coupling unit, where the first characteristic information indicates a real-time charging/discharging capability of the energy storage unit in each direct current coupling unit, and the actual discharge power is discharge power allocated to the energy storage unit in each direct current coupling unit.

With reference to the fourth aspect, in some implementations of the fourth aspect, the first characteristic information is represented by at least one of the following parameters: an SOC of an energy storage battery in the energy storage unit, an SOH of the energy storage battery, and a capacity of the energy storage battery.

With reference to the fourth aspect, in some implementations of the fourth aspect, the primary controller determines theoretical discharge power of the energy storage unit in each direct current coupling unit based on the expected discharge power value and the first characteristic information of the energy storage unit in the direct current coupling unit, the primary controller obtains a discharge power limit of each direct current coupling unit, where the discharge power limit is a limit of power that can be output by the energy storage unit in each direct current coupling unit, and the primary controller determines actual discharge power of each direct current coupling unit based on the theoretical discharge power and the discharge power limit.

With reference to the fourth aspect, in some implementations of the fourth aspect, the primary controller determines the theoretical discharge power of the energy storage unit based on the following formula:

$$P_{bat\_discharge\_1\_i} = P_{bat\_discharge\_sum} \frac{(1 - SOC_i) \cdot SOH_i \cdot CAPACITY_i}{\sum (1 - SOC_i) \cdot SOH_i \cdot CAPACITY_i},$$

where $P_{bat\_discharge\_1\_i}$ represents theoretical discharging power of an energy storage unit in an $i^{th}$ direct current coupling unit in the N direct current coupling units, $P_{bat\_discharge\_sum}$ represents an expected discharging power value of the energy storage units in the N direct current coupling units, $SOC_i$ represents an SOC of an energy storage battery in the energy storage unit in the $i^{th}$ direct current coupling unit, $SOH_i$ represents a SOH of the energy storage battery in the $i^{th}$ direct current coupling unit, $CAPACITY_i$ represents a capacity of the energy storage battery in the $i^{th}$ direct current coupling unit, and $1 \leq i \leq N$.

With reference to the fourth aspect, in some implementations of the fourth aspect, each direct current coupling unit further includes an energy unit, the energy unit is configured to generate electric energy, and before the primary controller determines the expected discharge power value of the energy storage units in the N direct current coupling units, the method further includes the following. The primary controller determines that a sum of maximum discharge power of energy units in all the direct current coupling units is less than required power of the load, and the primary controller determines to allocate the expected discharge power value to the energy storage units in the N direct current coupling units.

With reference to the fourth aspect, in some implementations of the fourth aspect, each direct current coupling unit further includes an inverter unit, the inverter unit is configured to receive, through a direct current bus, electric energy output by the energy storage unit, and provide electric energy to the load after performing direct current-to-alternating current conversion on the electric energy, and the primary controller determines a smallest value in the following parameters as the actual discharge power of each direct current coupling unit: the theoretical discharge power of the energy storage unit in each direct current coupling unit, the discharge power limit of each direct current coupling unit, and a first power value of each direct current coupling unit, where the first power value is a maximum value of power that can be output by the inverter unit in each direct current coupling unit.

With reference to the fourth aspect, in some implementations of the fourth aspect, the primary controller determines to allocate theoretical discharge power to M of the N direct current coupling units, where the M direct current coupling units are all or some of the N direct current coupling units, and the primary controller performs a plurality of rounds of iterative calculation, to determine actual discharge power of each of the M direct current coupling units, where each of the plurality of rounds of iterative calculation includes determining, by the primary controller, N1 first direct current coupling units, where the first direct current coupling unit is a direct current coupling unit whose theoretical discharge power is greater than a discharge power limit in the M direct current coupling units, N1 is a positive integer, and 0<N1≤M, determining, by the primary controller, that discharge power limits of the N1 first direct current coupling units are actual discharge power of the N1 first direct current coupling units, determining, by the primary controller, that the expected discharge power value of the energy storage units in the N direct current coupling units is decreased by a sum of actual discharge power of energy storage units in the N1 first direct current coupling units, and determining, by the primary controller, to allocate actual discharge power to an energy storage unit in a second direct current coupling unit, where the second direct current coupling unit includes a direct current coupling unit to which no actual discharge power is allocated in the M direct current coupling units.

With reference to the fourth aspect, in some implementations of the fourth aspect, the primary controller determines that theoretical discharge power values of all of the M direct current coupling units are less than discharge power limits corresponding to the M direct current coupling units, and the primary controller determines that actual discharge power of the M direct current coupling units is the theoretical discharge power corresponding to the M direct current coupling units.

According to a fifth aspect, a control method for a power system is provided. The power system includes a primary controller and N direct current coupling units. The N direct current coupling units are configured to provide electric energy to a load. Each of the N direct current coupling units includes an energy storage unit. The energy storage unit is configured to store electric energy. Herein, N is a positive integer. The method includes the following. The primary controller determines an expected charging power value of energy storage units in the N direct current coupling units, where the expected charging power value is a charging power value that is determined by the primary controller and that can be provided to the energy storage units in the N direct current coupling units, and the primary controller determines actual charging power of the energy storage unit in each direct current coupling unit based on the expected charging power value and first characteristic information of the energy storage unit in the direct current coupling unit, where the first characteristic information indicates a real-time charging/discharging capability of the energy storage unit in each direct current coupling unit, and the actual charging power is charging power allocated to the energy storage unit in each direct current coupling unit.

With reference to the fifth aspect, in some implementations of the fifth aspect, the first characteristic information is represented by at least one of the following parameters: an SOC of an energy storage battery in the energy storage unit, an SOH of the energy storage battery, and a capacity of the energy storage battery.

With reference to the fifth aspect, in some implementations of the fifth aspect, the primary controller determines theoretical charging power of the energy storage unit in each direct current coupling unit based on the expected charging power value and the first characteristic information of the energy storage unit in the direct current coupling unit, the primary controller obtains a charging power limit of each direct current coupling unit, where the charging power limit is a limit of power that can be input to the energy storage unit in each direct current coupling unit, and the primary controller determines actual charging power of each direct current coupling unit based on the theoretical charging power and the charging power limit.

With reference to the fifth aspect, in some implementations of the fifth aspect, the primary controller determines the theoretical charging power of the energy storage unit based on the following formula:

$$P_{bat\_charge\_1\_i} = P_{bat\_charge\_sum} \frac{(1 - SOC_i) \cdot SOH_i \cdot CAPACITY_i}{\sum (1 - SOC_i) \cdot SOH_i \cdot CAPACITY_i},$$

where $P_{bat\_charge\_1\_i}$ represents theoretical charging power of an energy storage unit in an $i^{th}$ direct current coupling unit in the N direct current coupling units, $P_{bat\_charge\_sum}$ represents the expected charging power value of the energy storage units in the N direct current coupling units, $SOC_i$ represents an SOC of an energy storage battery in the energy storage unit in the $i^{th}$ direct current coupling unit, $SOH_i$ represents an SOH of the energy storage battery in the $i^{th}$ direct current coupling unit, $CAPACITY_i$ represents a capacity of the energy storage battery in the $i^{th}$ direct current coupling unit, and $1 \leq i \leq N$.

With reference to the fifth aspect, in some implementations of the fifth aspect, each direct current coupling unit further includes an energy unit, the energy unit is configured to generate electric energy, and before the primary controller determines the expected charging power value of the energy storage units in the N direct current coupling units, the method further includes the following. The primary controller determines that a sum of maximum discharge power of energy units in all the direct current coupling units is greater than required power of the load, and is less than a sum of the required power of the load and required charging power of the energy storage units in all the direct current coupling units, and the primary controller determines to allocate the expected charging power value to the energy storage units in the N direct current coupling units.

With reference to the fifth aspect, in some implementations of the fifth aspect, each direct current coupling unit further includes an inverter unit, the inverter unit is used for the energy storage unit to absorb electric energy, and the primary controller determines a smallest value in the following parameters as the actual charging power of each direct current coupling unit: a theoretical charging power value of each direct current coupling unit, the charging power limit of each direct current coupling unit, and a second power value of each direct current coupling unit, where the second power value is a maximum value of power that can be input to the inverter unit in each direct current coupling unit.

With reference to the fifth aspect, in some implementations of the fifth aspect, the primary controller performs a plurality of rounds of iterative calculation, to determine actual charging power of each of M direct current coupling units, where each of the plurality of rounds of iterative calculation includes determining, by the primary controller, N1 first direct current coupling units, where the first direct current coupling unit is a direct current coupling unit whose theoretical charging power is greater than a charging power limit in the M direct current coupling units, N1 is a positive integer, and $0 < N1 \leq M$, determining, by the primary controller, that actual charging power of the N1 first direct current coupling units is charging power limits of the N1 first direct current coupling units, determining, by the primary controller, that the expected charging power value of the energy storage units in the N direct current coupling units is decreased by a sum of actual charging power energy storage units in the N1 first direct current coupling units, and determining, by the primary controller, to allocate actual discharge power to an energy storage unit in a second direct current coupling unit, where the second direct current coupling unit includes a direct current coupling unit to which no actual discharge power is allocated in the M direct current coupling units.

With reference to the fifth aspect, in some implementations of the fifth aspect, the primary controller determines that theoretical charging power values of all of the M direct current coupling units are less than charging power limits corresponding to the M direct current coupling units, and the primary controller determines that actual charging power of the M direct current coupling units is theoretical charging power corresponding to the M direct current coupling units.

According to a sixth aspect, a control method for a power system is provided. The power system includes a primary controller and N direct current coupling units. The N direct current coupling units are configured to supply power to a load and a power grid. Each of the N direct current coupling units includes an energy unit, an energy storage unit, and an inverter unit. The energy unit is configured to generate electric energy. The energy storage unit is configured to store the electric energy generated by the energy unit. The inverter unit is configured to receive, through a direct current bus, electric energy output by the energy unit, and provide electric energy to the load and the power grid after performing direct current-to-alternating current conversion on the electric energy. Herein, N is a positive integer. The method includes the following. The primary controller determines remaining power of the energy unit in each of the N direct current coupling units, where the remaining power includes power remaining after each direct current coupling unit provides electric energy to the energy storage unit and the load, the primary controller obtains an output power limit of each direct current coupling unit, where the output power limit is a limit of power that can be output by the inverter unit in each direct current coupling unit, and the primary controller determines a surplus power on-grid power reference value of each direct current coupling unit based on the remaining power and the output power limit, where surplus power on-grid power is power that is allocated by the energy unit in each direct current coupling unit and that is to be provided to the power grid.

With reference to the sixth aspect, in some implementations of the sixth aspect, the primary controller determines a surplus power on-grid capability reference value of each direct current coupling unit based on the remaining power and the output power limit, where the surplus power on-grid capability reference value indicates a maximum value of power that can be output by each direct current coupling unit to the power grid, and the primary controller determines the surplus power on-grid power reference value of each direct current coupling unit based on the surplus power on-grid capability reference value and a limit of power that can be received by the power grid.

With reference to the sixth aspect, in some implementations of the sixth aspect, the primary controller determines a smallest value in the following parameters as the surplus power on-grid capability reference value of each direct current coupling unit: the remaining power of the energy unit in each direct current coupling unit and the output power limit of each direct current coupling unit.

With reference to the sixth aspect, in some implementations of the sixth aspect, the primary controller determines the surplus power on-grid power reference value of each direct current coupling unit based on the following formula:

$$P_{on\_grid\_ref\_i} = \min\left(P_{on\_grid\_lmt} \frac{P_{on\_grid\_i}}{\sum P_{on\_grid\_i}}, P_{on\_grid\_i}\right),$$

where $P_{on\_grid\_ref\_i}$ represents a surplus power on-grid power reference value of an $i^{th}$ direct current coupling unit in the N direct current coupling units, $P_{on\_grid\_i}$ represents a surplus power on-grid capability reference value, $P_{on\_grid\_lmt}$ represents the limit of power that can be received by the power grid, $\Sigma P_{on\_grid\_i}$ represents a sum of surplus power on-grid capability reference values of the N direct current coupling units, and $1 \leq i \leq N$.

With reference to the sixth aspect, in some implementations of the sixth aspect, the primary controller determines that maximum discharge power of energy units in the N direct current coupling units is greater than a sum of required power of the load and required charging power of energy storage units in all the direct current coupling units, and the primary controller determines that actual charging power allocated to the energy storage unit in each of the N direct current coupling units is a charging power limit of the energy storage unit, where the actual charging power is charging power allocated to the energy storage unit in each direct current coupling unit.

With reference to the sixth aspect, in some implementations of the sixth aspect, the primary controller determines power output by the energy unit in each direct current coupling unit to the load, and the primary controller determines that power remaining after the energy unit in each direct current coupling unit outputs the actual charging power to the energy storage unit and outputs the power to the load is the remaining power of the energy unit in each direct current coupling unit.

With reference to the sixth aspect, in some implementations of the sixth aspect, the primary controller determines remaining power of a second direct current coupling unit, where the second direct current coupling unit is a direct current coupling unit, in the N direct current coupling units, whose remaining power is greater than 0 after the energy unit outputs power to the energy storage unit and the load, and the primary controller determines that the remaining power of the second direct current coupling unit is power remaining after the energy unit outputs power to the energy storage unit, the load, and a first direct current coupling unit, where the first direct current coupling unit includes a direct current coupling unit, in the N direct current coupling units, whose remaining power is less than 0 after the energy unit outputs power to the energy storage unit and the load.

According to a seventh aspect, an apparatus is provided, and includes a processor. The processor is coupled to a memory, and may be configured to execute instructions in the memory, so that the apparatus performs the method in any one of the fourth aspect to the sixth aspect or the possible implementations of the fourth aspect to the sixth aspect.

According to an eighth aspect, a processor is provided, and includes an input circuit, an output circuit, and a processing circuit. The processing circuit is configured to receive a signal by using the input circuit, and transmit a signal by using the output circuit, so that the processor performs the method in any one of the fourth aspect to the sixth aspect or the possible implementations of the fourth aspect to the sixth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, and a signal output by the output circuit may be output to, for example, but not limited to, a transmitter and transmitted by the transmitter. In addition, the input circuit and the output circuit may be a same circuit, and the circuit is used as the input circuit and the output circuit at different moments. Specific implementations of the processor and the various circuits are not limited in embodiments of this application.

According to a ninth aspect, a processing apparatus is provided, and includes a processor and a memory. The processor is configured to read instructions stored in the memory, and may receive a signal by using a receiver, and transmit a signal by using a transmitter, to perform the method in any one of the fourth aspect to the sixth aspect or the possible implementations of the fourth aspect to the sixth aspect.

Optionally, there are one or more processors, and there are one or more memories.

Optionally, the memory may be integrated with the processor, or the memory and the processor are separately disposed.

In a specific implementation process, the memory may be a non-transitory memory, for example, a read-only memory (ROM). The memory and the processor may be integrated into one chip, or may be separately disposed in different chips. A type of the memory and a manner in which the memory and the processor are disposed are not limited in embodiments of this application.

The processing apparatus in the ninth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor, and exists independently.

According to a tenth aspect, a computer program product is provided. The computer program product includes a computer program (or code or instructions). When the computer program is run, a computer is enabled to perform the method in any one of the fourth aspect to the sixth aspect or the possible implementations of the fourth aspect to the sixth aspect.

According to an eleventh aspect, a computer-readable medium is provided. The computer-readable medium stores a computer program (or code or instructions). When the computer program is run on a computer, the computer is enabled to perform the method in any one of the fourth aspect to the sixth aspect or the possible implementations of the fourth aspect to the sixth aspect.

DESCRIPTION OF EMBODIMENTS

The technical solutions in this application are described below with reference to the accompanying drawings.

Figure 1:
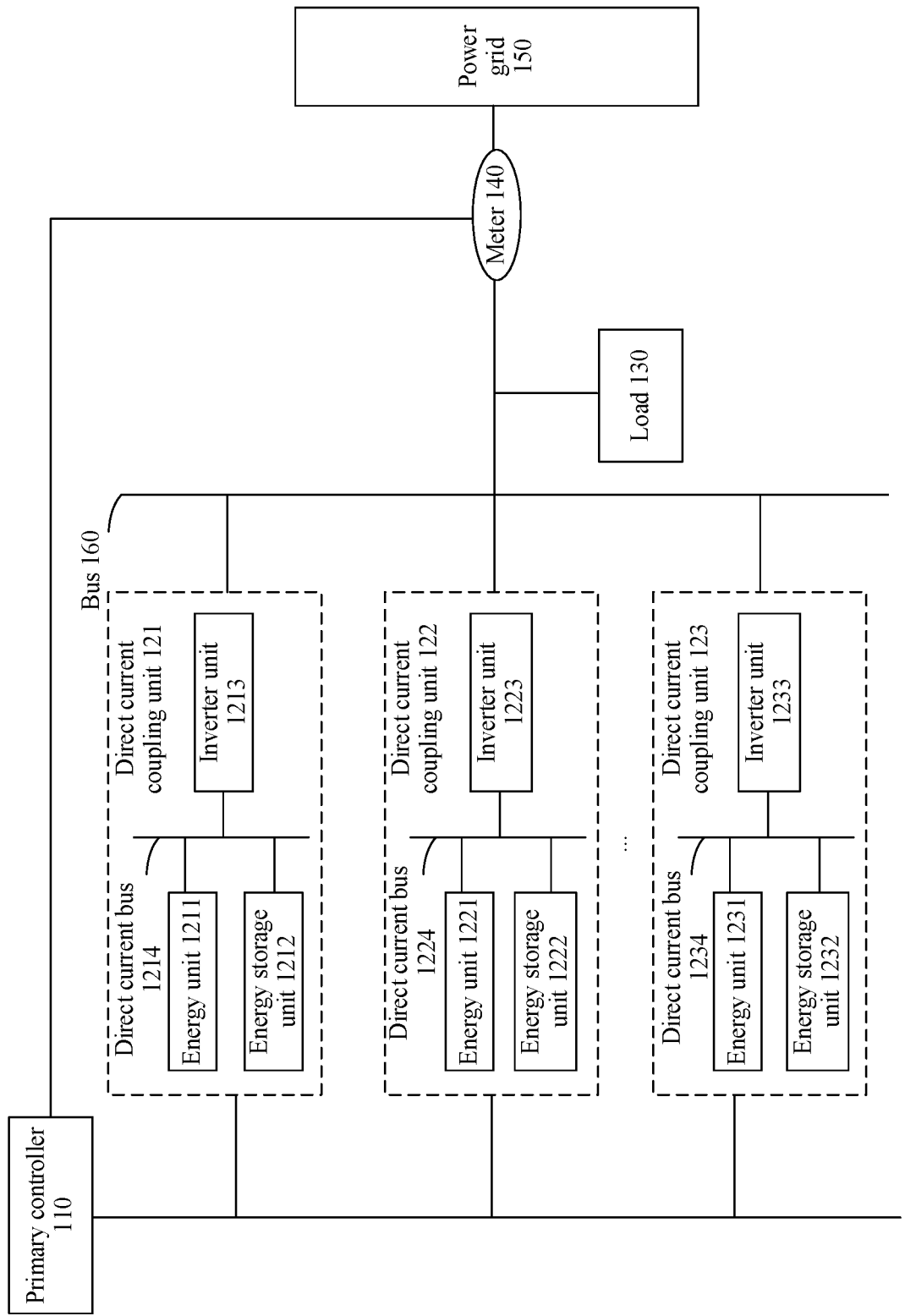
FIG. 1 is a schematic diagram of an application scenario applicable to an embodiment of this application.

The technical solutions provided in this application may be applied to various power systems. For ease of understanding embodiments of this application, a power system applicable to embodiments of this application is described in detail with reference to FIG. 1. FIG. 1 is a schematic diagram of a power system according to an embodiment of this application. As shown in FIG. 1, the power system includes at least two direct current coupling units, for example, direct current coupling units 121, 122, and 123 shown in FIG. 1. The power system may further include at least one primary controller 110. The primary controller 110 may be configured to control power allocation in the direct current coupling units 121 to 123, collect a voltage of a meter 140, and the like. The primary controller 110 may be an energy management system (EMS) or a smart array control unit (SACU). The power system further includes the meter 140. The meter 140 is connected between a load 130 and a power grid 150, and is configured to detect and feed back, in real time, power supplied by the power grid to the load 130. The power system may provide electric energy to the load 130, or may supply power to the power grid 150.

Each direct current coupling unit includes an energy unit, for example, energy units 1211, 1221, and 1231 shown in FIG. 1. Each direct current coupling unit may further include an energy storage unit, for example, energy storage units 1212, 1222, and 1232 shown in FIG. 1. Each direct current coupling unit further includes an inverter unit, for example, inverter units 1213, 1223, and 1233 shown in FIG. 1. Each direct current coupling unit may further include a secondary controller. The energy units 1211, 1221, and 1231 are configured to generate electric energy. The energy storage units 1212, 1222, and 1232 may be configured to store the electric energy generated by the energy units, or when power needs to be supplied to the load 130, output a direct current to the inverter units. The direct current is converted by the inverter units, that is, undergoes direct current (DC)-to-alternating current (AC) (or DC/AC) processing, to obtain an alternating current, and the alternating current is provided to the load 130. The secondary controller may be configured to communicate with the primary controller 110 or with a secondary controller in another direct current coupling unit. For the inverter units, direct current sides are connected to direct current buses 1214, 1224, and 1234, and receive, through the direct current buses 1214 to 1234, electric energy discharged by the energy units 1211, 1221, and 1231 and/or the energy storage units 1212, 1222, and 1232, and alternating current sides are connected to the load 130 and the power grid 150 through a bus 160, and provide electric energy to the load 130 and/or the power grid 150 through the bus 160. The inverter units 1213, 1223, and 1233 may be further configured to absorb electric energy, and provide electric energy to the energy storage units 1212, 1222, and 1232 through the direct current buses 1214, 1224, and 1234.

Optionally, the energy unit may be a new energy unit, for example, a power apparatus that generates electric energy by using solar energy, geothermal energy, wind energy, marine energy, biomass energy, or nuclear fusion energy. An energy unit that uses solar energy to generate electric energy is used as an example below.

Figure 2:
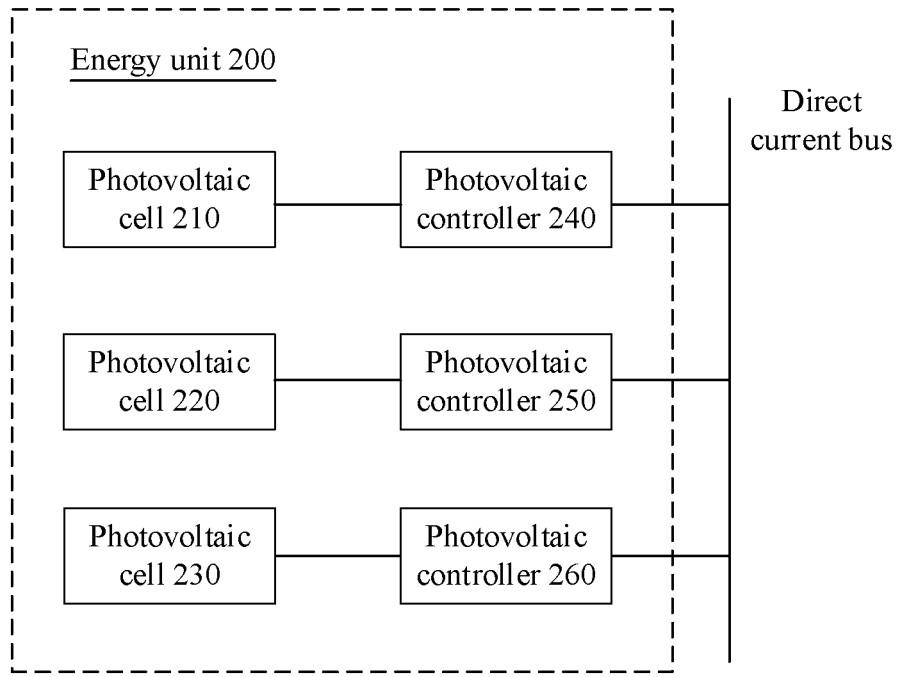
FIG. 2 is an example schematic diagram of a structure of an energy unit applicable to this application.

FIG. 2 is a schematic diagram of a structure of an energy unit 200 according to an embodiment of this application. The energy unit 200 may be applied to the system shown in FIG. 1. The energy unit may include at least one photovoltaic cell, for example, photovoltaic cells 210, 220, and 230 shown in FIG. 2. The energy unit may further include at least one photovoltaic controller, for example, photovoltaic controllers 240, 250, and 260 shown in FIG. 2. The photovoltaic cells 210 to 230 are connected to a direct current bus through the photovoltaic controllers 240 to 260. The photovoltaic cells 210 to 230 are configured to directly convert light energy of the sun into electric energy, for example, a monocrystalline silicon solar photovoltaic cells, polycrystalline silicon solar photovoltaic cells, or amorphous silicon solar photovoltaic cells. The photovoltaic controllers 240 to 260 are configured to respectively control the photovoltaic cells 210 to 230. Optionally, the photovoltaic controller may obtain maximum discharge power that can be provided by a corresponding photovoltaic cell. For example, the photovoltaic controller may be a maximum power point tracking (MPPT) controller. The MPPT controller can track a maximum power point of the photovoltaic cell in real time, and may control the photovoltaic cell to output electric energy at maximum power.

Figure 3:
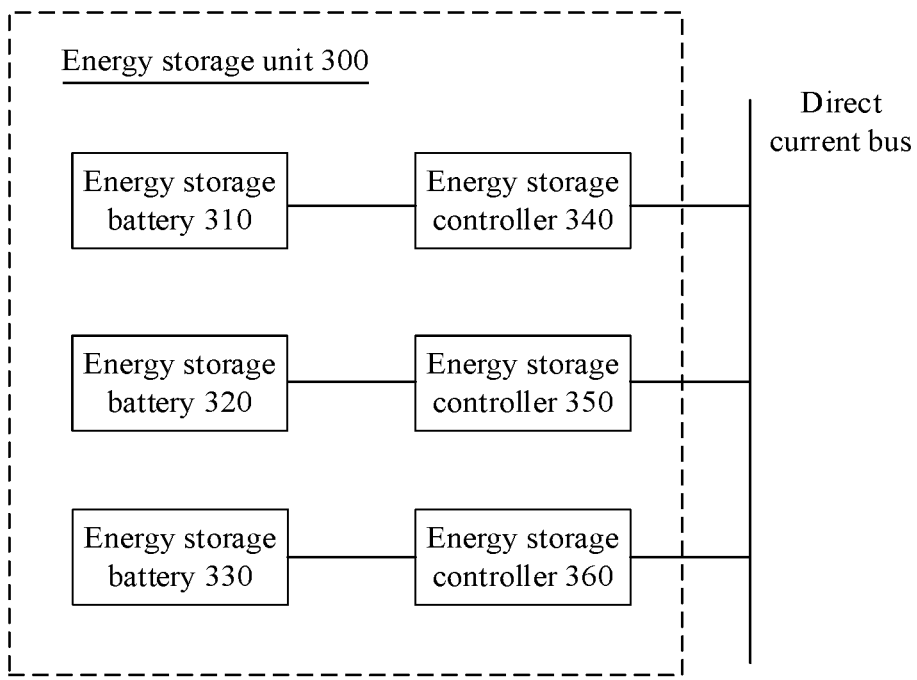
FIG. 3 is an example schematic diagram of a structure of an energy storage unit applicable to this application.

FIG. 3 is a schematic diagram of a structure of an energy storage unit 300 according to an embodiment of this application. The energy storage unit 300 may include at least one energy storage battery, for example, energy storage batteries 310, 320, and 330 shown in FIG. 3. The energy storage unit 300 may further include at least one energy storage controller, for example, energy storage controllers 340, 350, and 360 shown in FIG. 3. The energy storage batteries 310 to 330 are connected to a direct current bus through the energy storage controllers 340 to 360. The energy storage batteries 310 to 330 may be configured to store electric energy, and may be further configured to provide electric energy. The energy storage battery may be a lead-acid battery, a lithium-ion energy storage battery, or the like. The energy storage controllers 340 to 360 are respectively configured to control the energy storage batteries 310 to 330, and may be DC-to-DC (DC/DC) controllers.

Figure 4:
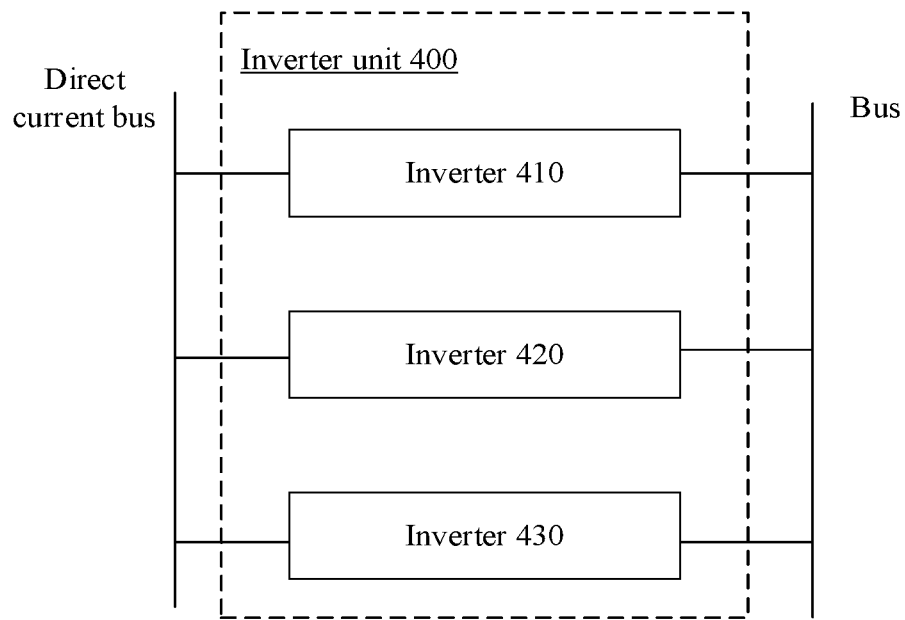
FIG. 4 is an example schematic diagram of a structure of an inverter unit applicable to this application.

FIG. 4 is a schematic diagram of a structure of an inverter unit 400 according to an embodiment of this application. The inverter unit 400 may include at least one inverter, for example, inverters 410, 420, and 430 shown in FIG. 4. For the inverters 410 to 430, direct current sides are connected to a direct current bus, and alternating current sides are connected to a bus (such as 160 in FIG. 1), or alternating current sides are connected to a load 130 and a power grid 150. A power direction on the inverters 410 to 430 may be from the direct current bus to the load 130 or the power grid 150, or may be from absorbed power to the direct current bus, for example, from power absorbed from an energy unit in another direct current coupling unit.

It should be noted that a photovoltaic system is used as an example this application, but does not constitute any limitation on this application.

In an application scenario of the power system depicted in FIG. 1, electric energy output by the power system may preferentially meet electric energy requirements of a local load and an energy storage unit, and then electric energy is provided to a power grid, to increase a self-generation and self-consumption rate and reduce impact on the power grid.

A scenario in which the power system preferentially meets the electric energy requirements of the local load and the energy storage unit is described below with reference to FIG. 5 to FIG. 10.

Figure 5:
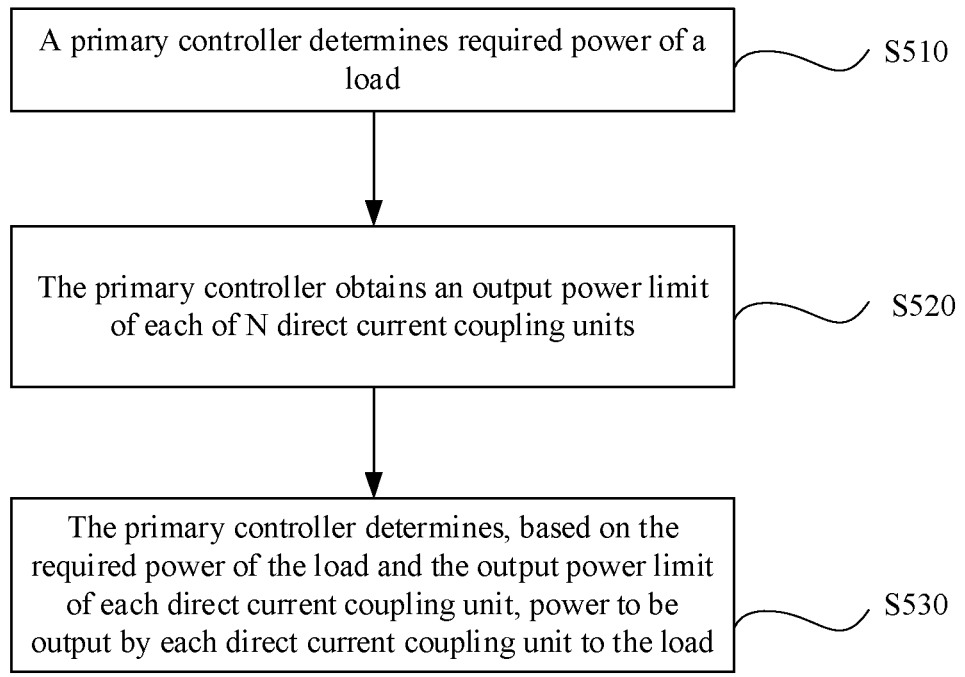
FIG. 5 is a schematic flowchart of a method for allocating output power to an energy unit according to this application.
Figure 6:
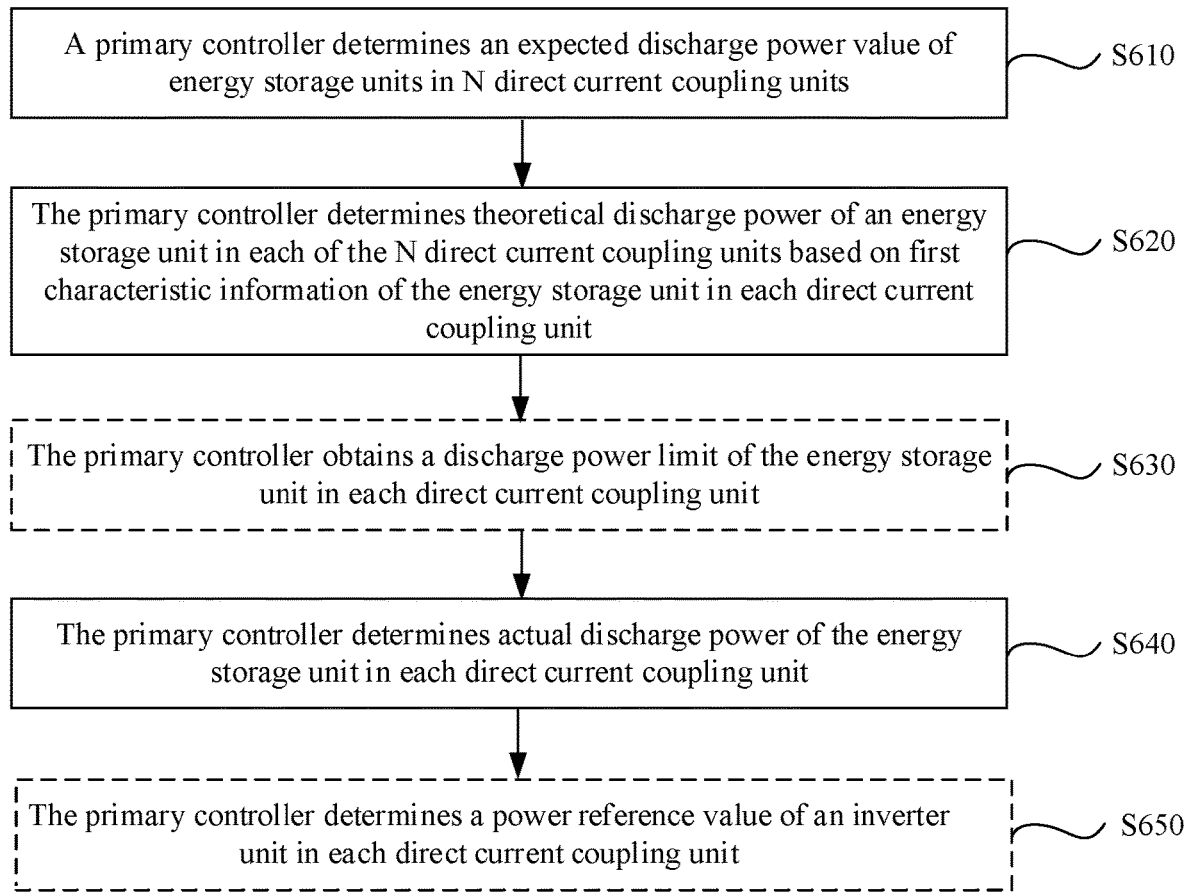
FIG. 6 is a schematic flowchart of a method for allocating output power to an energy storage unit according to this application.
Figure 7:
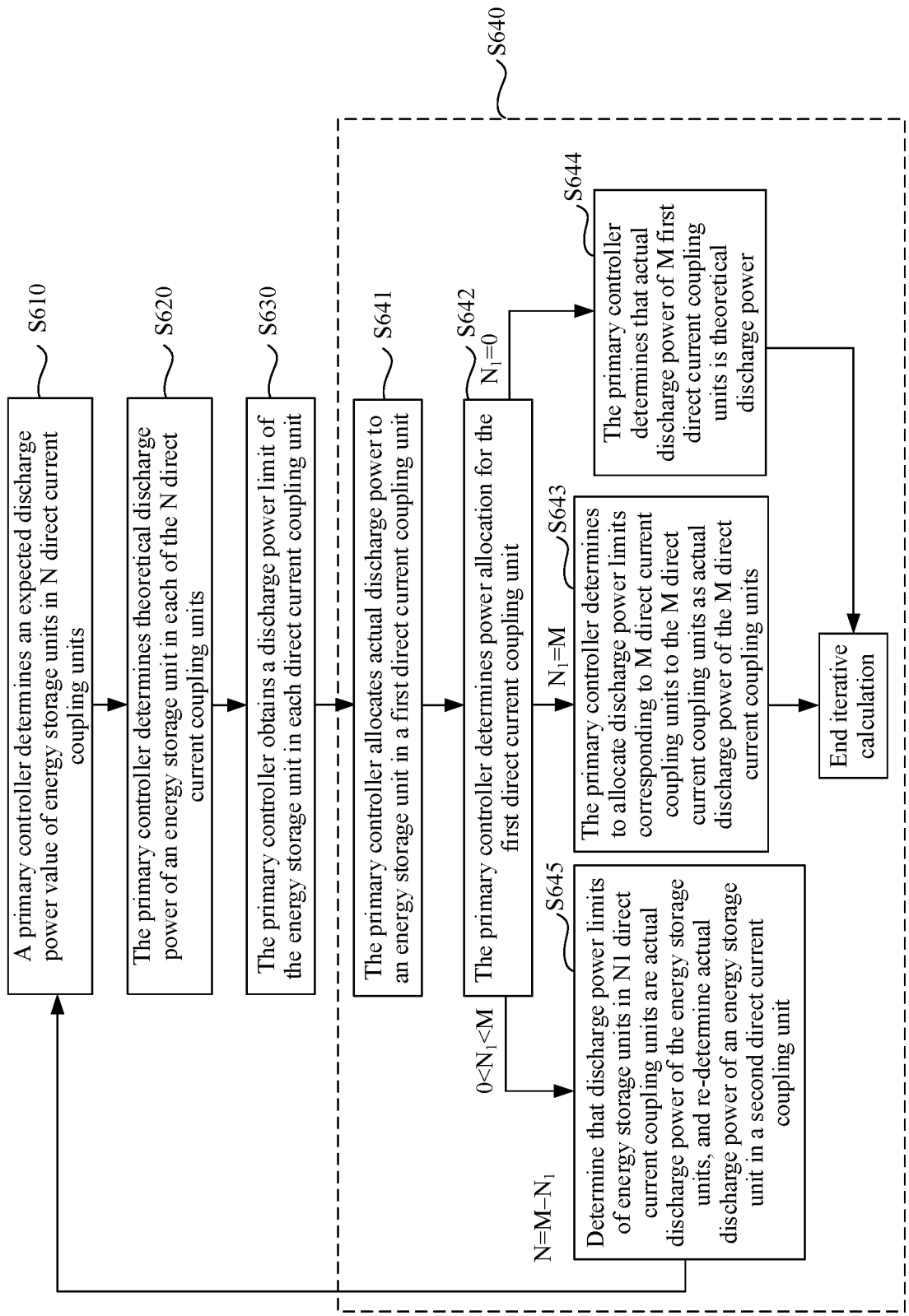
FIG. 7 is a schematic flowchart of another method for allocating output power to an energy storage unit according to this application.
Figure 8:
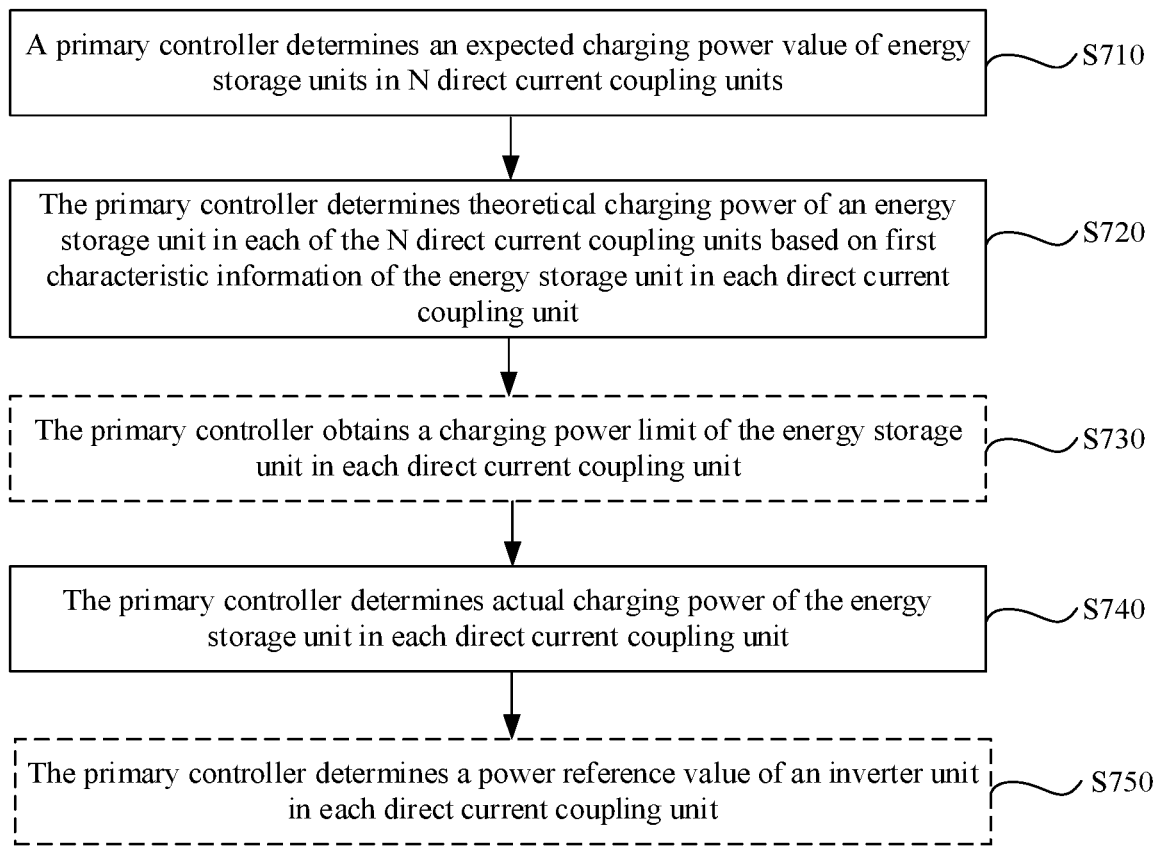
FIG. 8 is a schematic flowchart of a method for allocating input power to an energy storage unit according to this application.
Figure 9:
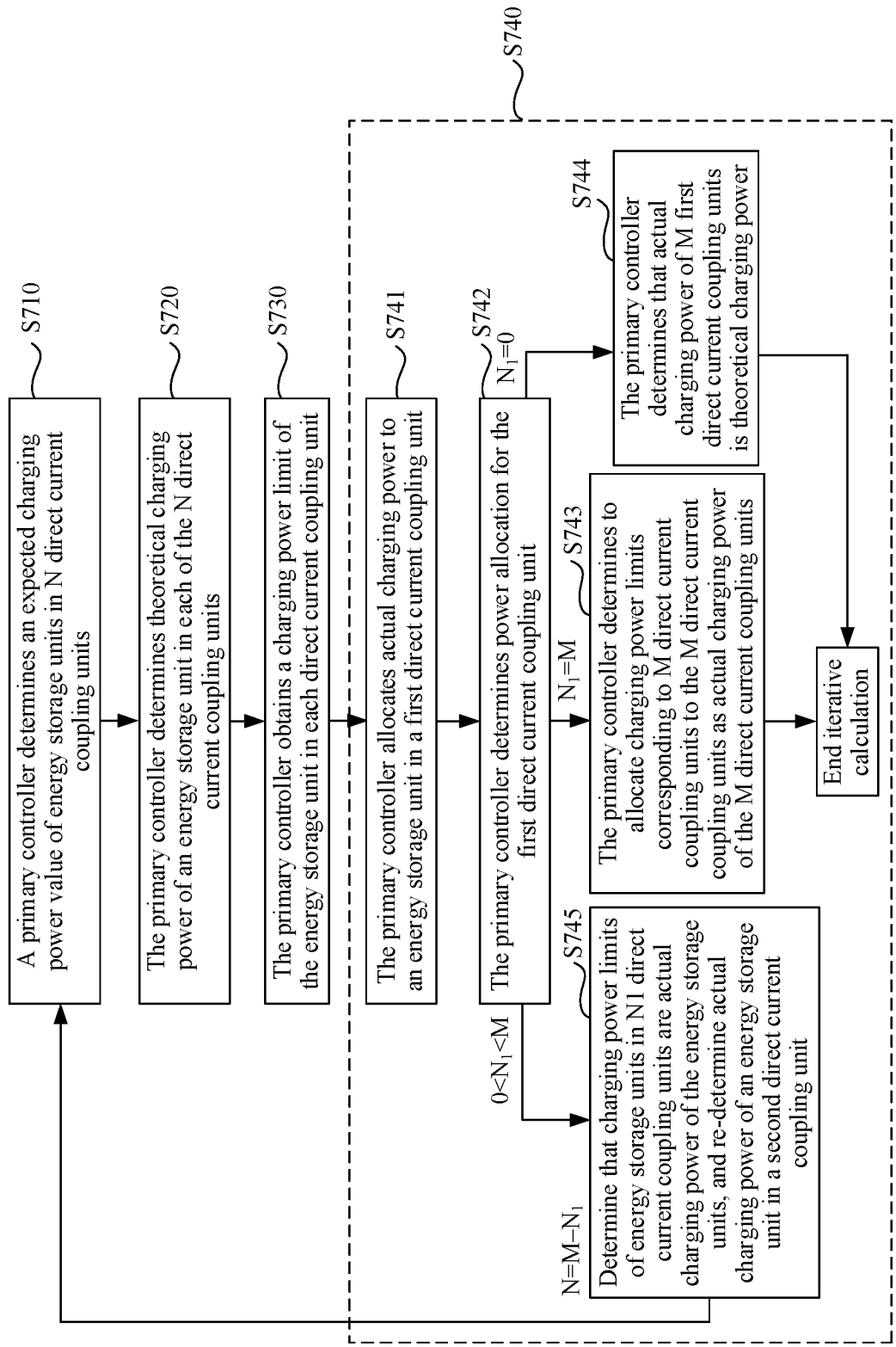
FIG. 9 is a schematic flowchart of another method for allocating output power to an energy storage unit according to this application.
Figure 10:
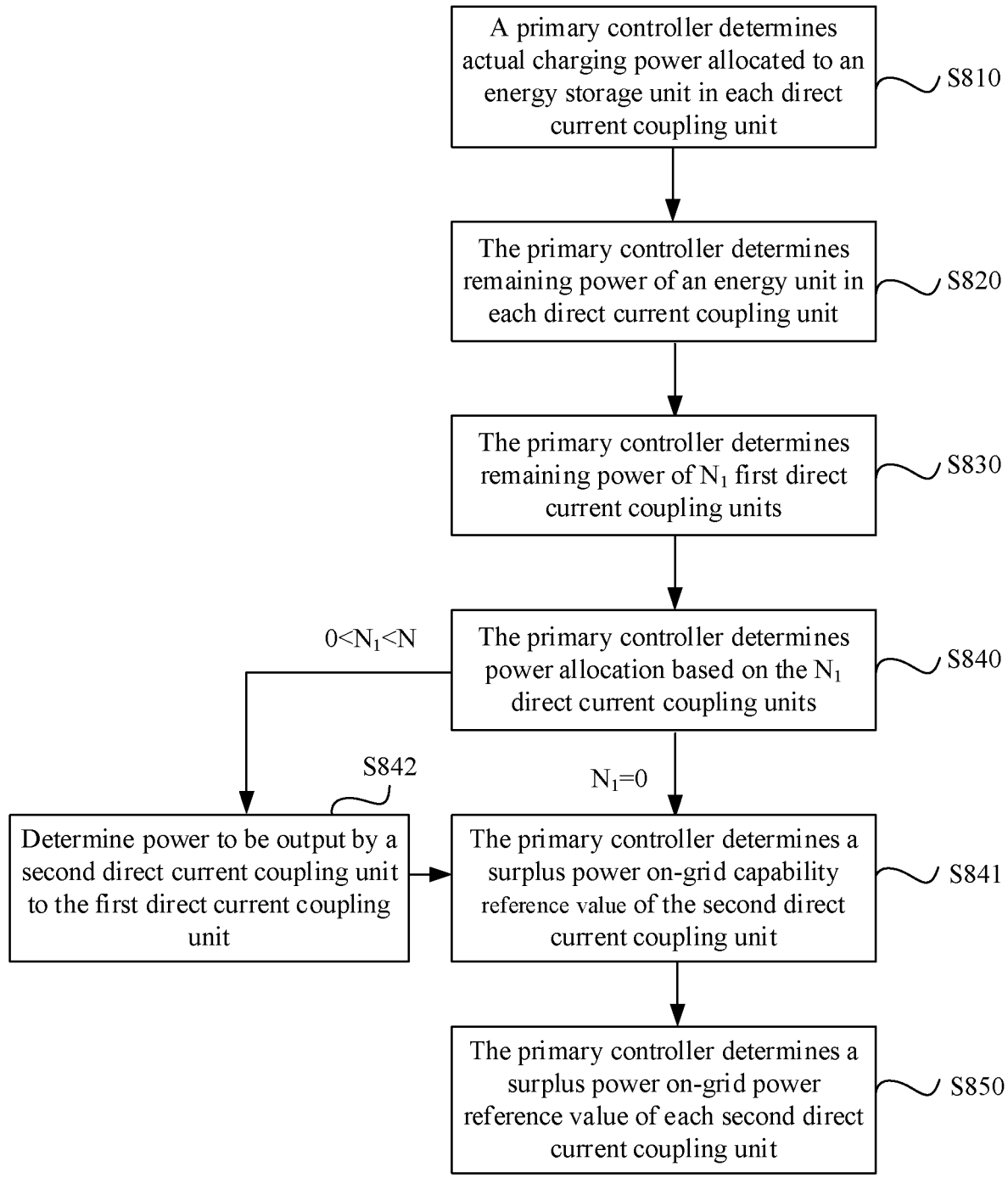
FIG. 10 is a schematic flowchart of another method for allocating output power to an energy unit according to this application.

It should be noted that FIG. 5 shows a method 500 for allocating output power to an energy unit in a power system, FIG. 6 shows a method 600 for allocating output power to an energy storage unit in a power system, FIG. 8 shows a method 700 for allocating absorbed power to an energy storage unit in a power system, and FIG. 10 shows another method 800 for allocating output power to an energy unit in a power system. The methods may be independently used in a power system, or may be used in combination.

For example, when the method 500 and the method 600 are used in combination, it may be understood as that the method 500 is used to allocate output power to an energy unit in a direct current coupling unit, to meet required power of a load 130. If the energy unit cannot meet the required power of the load 130, the method 600 is used to allocate output power to an energy storage unit in the direct current coupling unit, to meet a power requirement of the load 130.

For another example, when the method 500 and the method 700 are used in combination, it may be understood as that the method 500 is used to allocate output power to an energy unit in a direct current coupling unit. If the energy unit can meet required power of a load, and there is remaining electric energy that can be used for storage by an energy storage unit, the method 700 may be used to allocate input power to the energy storage unit in the direct current coupling unit, to preferentially store electric energy for the energy storage unit in the direct current coupling unit while ensuring that the required power of the load is met, so as to reduce impact on a power grid.

When the method 500 and the method 800 are used in combination, it may be understood as that the method 500 is used to allocate output power to an energy unit in a direct current coupling unit, to meet a power requirement of a load 130. If the energy unit can meet a power requirement for charging the load 130 and an energy storage unit, and has remaining power, the method 800 may be used to allocate, to the energy unit in the direct current coupling unit, power to be output to a power grid.

FIG. 5 is a schematic flowchart of a method 500 for allocating output power to an energy unit in a power system according to this application. The method may be performed by a primary controller 110. The power system includes N direct current coupling units, where N is a positive integer. For clarity, descriptions are provided below by using a photovoltaic power system that converts solar energy into electric energy as an example. The method includes at least the following several steps.

S510: The primary controller determines required power of a load.

In a possible implementation, the primary controller collects meter data $P_{on\_grid}$ and active power $P_{inv\_i}$ output by each inverter unit in each direct current coupling unit, and determines the required power $P_{load}$ of the load based on the active power output by the inverter unit and the meter data. Further, the required power of the load may be expressed by using the following formula:

$$P_{load} = \sum_{i=1}^{N} P_{inv\_i} - P_{on\_grid} \qquad (1)$$

S520: The primary controller obtains an output power limit of each of the N direct current coupling units.

The output power limit may be an active power output limit $P_{inv\_lmt\_i}$ of the inverter unit in each direct current coupling unit.

It may be understood that if an inverter unit in a direct current coupling unit includes a plurality of inverters, an output power limit of the direct current coupling unit is a sum of active power output limits of all the inverters.

S530: The primary controller determines, based on the required power of the load and the output power limit of each direct current coupling unit, a power value to be output by each direct current coupling unit to the load.

In a possible implementation, the primary controller first obtains maximum discharge power of an energy unit in each direct current coupling unit. The maximum discharge power of the energy unit may be understood as maximum discharge power of a photovoltaic cell in the energy unit. The primary controller may obtain the maximum discharge power of the photovoltaic cell from a photovoltaic controller in the energy unit. If the photovoltaic controller is an MPPT controller, the MPPT controller may provide the maximum discharge power of the photovoltaic cell corresponding to the MPPT controller to the primary controller.

It should be noted that if the photovoltaic cell corresponding to the MPPT controller is not at an MPPT point, the maximum discharge power value provided by the MPPT controller to the primary controller may be a value estimated by the MPPT controller for the discharge power of the photovoltaic cell corresponding to the MPPT controller, or if the photovoltaic cell corresponding to the MPPT controller is in a derated state, the MPPT controller provides derated maximum discharge power to the primary controller.

It should be understood that if an energy unit in a direct current coupling unit includes a plurality of photovoltaic cells, maximum discharge power of the energy unit in the direct current coupling unit is a sum of maximum discharge power of all the photovoltaic cells.

In addition, the primary controller may further determine whether a sum of maximum discharge power of energy units in the N direct current coupling units is greater than the required power of the load.

If the sum of the maximum discharge power of the energy units in the N direct current coupling units is not greater than the required power of the load, the primary controller determines a smallest value in the following items as the power value to be output by each direct current coupling unit to the load: the maximum discharge power of the energy unit in each direct current coupling unit and the output power limit of each direct current coupling unit.

A power value $P_{pv\_to\_load\_i}$ to be output by an $i^{th}$ direct current coupling unit in the N direct current coupling units to the load is as follows:

$$P_{pv\_to\_load\_i} = \min(P_{pv_i}, P_{inv\_lmt\_i}) \quad (2)$$

If the sum of the maximum discharge power of the energy units in the N direct current coupling units is greater than the required power of the load, the primary controller determines, based on the maximum discharge power of the energy unit in each direct current coupling unit, power that indicates power that needs to be discharged by the energy unit in each direct current coupling unit, and determines a smallest value in the following items as the power value to be output by each direct current coupling unit to the load: the power that indicates power that needs to be discharged by the energy unit in each direct current coupling unit and the output power limit of each direct current coupling unit.

A power value $P_{pv\_to\_load\_i}$ to be output by an $i^{th}$ direct current coupling unit in the N direct current coupling units to the load is as follows:

$$P_{pv\_to\_load\_i} = \min\left(P_{load} \frac{P_{pv\_i}}{P_{pv\_sum}}, P_{inv\_lmt\_i}\right) \quad (3)$$

where $P_{pv\_sum}$ represents the sum of the maximum discharge power of the energy units in the N direct current coupling units, and $P_{pv\_sum} = \Sigma P_{pv\_i}$.

When the sum of the maximum discharge power of the energy units in the N direct current coupling units is not greater than the required power of the load, to preferentially meet a power supply requirement of the load, energy storage units in the N direct current coupling units need to be discharged to provide electric energy to the load. FIG. 6 shows a method 600 for allocating output power to an energy storage unit according to an embodiment of this application. It should be understood that, that a sum of maximum discharge power of energy units in N direct current coupling units is not greater than required power of a load is merely an application scenario of the method. The method may be further applied to another scenario in which an energy storage unit indicates power that needs to be discharged, for example, a scenario in which the energy storage unit provides electric energy to a power grid. The method includes at least the following several steps.

S610: A primary controller determines an expected discharge power value of energy storage units in the N direct current coupling units.

Further, when the sum of the maximum discharge power of the energy units in the N direct current coupling units is not greater than the required power of the load, the expected discharge power value $P_{bat\_discharge\_sum}$ of the energy storage units in the N direct current coupling units is a difference between the required power of the load and power output by the energy units in the N direct current coupling units to the load. The power output by the energy units in the N direct current coupling units to the load may be a sum of first power values of all the direct current coupling units.

The expected discharge power value of the energy storage units in the N direct current coupling units may be expressed as follows:

$$P_{bat\_discharge\_sum} = P_{load} - \sum P_{pv\_to\_load\_i}, \quad (4)$$

where $P_{load}$ represents the required power of the load, and $\Sigma P_{pv\_to\_load\_i}$ represents a sum of the power output by the energy units in the N direct current coupling units to the load.

S620: The primary controller determines theoretical discharge power of an energy storage unit in each of the N direct current coupling units based on the expected discharge power value of the energy storage unit in the N direct current coupling units and first characteristic information of the energy storage unit in each direct current coupling unit.

The theoretical discharge power may be understood as power that needs to be provided by the energy storage unit in each direct current coupling unit to the load.

The first characteristic information may indicate a real-time charging/discharging capability of the energy storage unit in each direct current coupling unit. The first characteristic information may be represented by at least one of the following parameters: an SOC of an energy storage battery in the energy storage unit, an SOH of the energy storage battery, and a capacity of the energy storage battery.

In a possible implementation, theoretical discharge power $P_{bat\_discharge\_1\_i}$ of an energy storage unit in an $i^{th}$ direct current Vcoupling unit in the N direct current coupling units may be determined based on the following formula:

$$P_{bat\_discharge\_1\_i} = P_{bat\_discharge\_sum} \frac{(1 - SOC_i) \cdot SOH_i \cdot CAPACITY_i}{\sum (1 - SOC_i) \cdot SOH_i \cdot CAPACITY_i}, \quad (5)$$

where $P_{bat\_discharge\_sum}$ represents the expected discharge power value of the energy storage units in the N direct current coupling units, and $SOC_i$, $SOH_i$, and $CAPACITY_i$ respectively represent an SOC, an SOH, and a capacity of an energy storage battery in the $i^{th}$ direct current coupling unit.

S630: The primary controller obtains a discharge power limit of the energy storage unit in each direct current coupling unit.

The discharge power limit $P_{bat\_discharge\_lmt\_i}$ of the energy storage unit may be understood as a maximum value of power that can be output by the energy storage unit.

S640: The primary controller determines actual discharge power of the energy storage unit in each direct current coupling unit based on the theoretical discharge power of the energy storage unit in each direct current coupling unit and the discharge power limit of the energy storage unit in each direct current coupling unit.

The actual discharge power of the energy storage unit in each direct current coupling unit may be understood as power that can be actually provided by the energy storage unit to the load.

In a possible implementation, the primary controller determines a smallest value in the following items as the actual discharge power $P_{bat\_discharge\_2\_i}$ of the energy storage unit in each direct current coupling unit: the theoretical discharge power of the energy storage unit in each direct current coupling unit and the discharge power limit of the energy storage unit in each direct current coupling unit. This may be expressed as follows:

$$P_{bat\_discharge\_2\_i} = \min(P_{bat\_discharge\_1\_i}, P_{bat\_discharge\_lmt\_i}) \quad (6)$$

In another possible implementation, the energy storage unit outputs power through an inverter unit, and the inverter unit has borne power output by the energy unit to the load. Therefore, when power to be provided to the load is allocated to the energy storage unit, output power allocated to the energy unit needs to be considered. That is, actual discharge power $P_{bat\_discharge\_2\_i}$ of the energy storage unit in the $i^{th}$ direct current coupling unit may be expressed as follows:

$$P_{bat\_discharge\_2\_i} = \quad (7)$$
$$\min(P_{bat\_discharge\_1\_i}, P_{bat\_discharge\_lmt\_i}, P_{inv\_lmt\_i} - P_{pv\_to\_load\_i}),$$

where $P_{bat\_discharge\_1\_i}$ represents the theoretical discharge power of the energy storage unit in the $i^{th}$ direct current coupling unit, $P_{bat\_discharge\_lmt\_i}$ represents a discharge power limit of the energy storage unit in the $i^{th}$ direct current coupling unit, and $P_{inv\_lmt\_i} - P_{pv\_to\_load\_i}$ represents a limit of power (an example of the first power value) that can be output after the inverter unit bears the power output by the energy unit to the load.

It is assumed that it is determined, based on the formula (5), to allocate theoretical discharge power to energy storage units in M of the N direct current coupling units, where M is a positive integer, and M≤N, and amplitude limiting is performed on the theoretical discharge power of the M direct current coupling units in an amplitude limiting manner shown in the formula (6). An amplitude limiting manner shown in the formula (7) is similar to this. In a possible implementation, a manner of determining the actual discharge power of the energy storage unit in each direct current coupling unit in step S640 is described with reference to steps S641 to S644 in FIG. 7.

S641: The primary controller allocates actual discharge power to an energy storage unit in a first direct current coupling unit.

The first direct current coupling unit is a direct current coupling unit whose theoretical discharge power is greater than or equal to a discharge power limit corresponding to the direct current coupling unit in the M direct current coupling units. The primary controller determines that there are N1 first direct current coupling units in the M direct current coupling units, where N1 is a positive integer, and 0≤N1≤M. The primary controller determines to allocate discharge power limits corresponding to the N1 first direct current coupling units to the N1 first direct current coupling units as actual discharge power of the N1 first direct current coupling units.

S642: The primary controller determines power allocation for the first direct current coupling unit.

When N1=M, S643 is performed, and the primary controller determines that actual discharge power of an energy storage unit in the first direct current coupling unit is a discharge power limit of the energy storage unit in the first direct current coupling unit, and ends iterative calculation.

In this case, discharge power limits corresponding to all energy storage units in the M direct current coupling units are allocated to the energy storage units as actual discharge power.

When N1=0, in S644, the primary controller determines that the actual discharge power of the M first direct current coupling units is theoretical discharge power, and ends iterative calculation.

In this case, none of the N1 first direct current coupling units is in an amplitude limiting state, and all power that needs to be provided by the energy storage unit to the load is allocated.

When 0<N1<M, in S645, the primary controller determines that actual discharge power of energy storage units in the N1 first direct current coupling units is discharge power limits of the energy storage units in the N1 first direct current coupling units, and re-determines actual discharge power of an energy storage unit in a second direct current coupling unit.

It may be understood that the second direct current coupling unit includes a direct current coupling unit to which no actual discharge power is allocated in the M direct current coupling units. The re-determining actual discharge power of an energy storage unit in a second direct current coupling unit is performing S610 again to perform iterative calculation. In this case, the expected discharge power value of the energy storage units in the N direct current coupling units is a difference between $P_{bat\_discharge\_sum}$ and a sum of the actual discharge power of the energy storage units in the N1 first direct current coupling units.

The foregoing steps are repeated until allocation of $P_{bat\_discharge\_sum}$ is completed, or the actual discharge power allocated to the energy storage units in the M direct current coupling units reaches the discharge power limits corresponding to the energy storage units.

Optionally, the method may further include S650: The primary controller determine a power reference value $P_{inv\_ref\_i}$ of an inverter unit in each direct current coupling unit.

The power reference value may be understood as an output power value of the inverter unit. The power reference value $P_{inv\_ref\_i}$ may be expressed as follows:

$$P_{inv\_ref\_i} = P_{bat\_discharge\_2\_i} + P_{pv\_to\_load\_i} \qquad (8)$$

The energy unit and the energy storage unit output power through the inverter unit. Therefore, the power reference value may represent total output power allocated by the primary controller to the direct current coupling unit.

Therefore, in this application, discharge power is provided to the energy storage unit in each direct current coupling unit through even allocation based on the formula (5), and the actual discharge power to be provided to the load is allocated to each direct current coupling unit with reference to the real-time discharging capability of the energy storage unit in each direct current coupling unit, so that the discharge power of the energy storage unit can be properly allocated, to avoid a case in which the energy storage battery is over discharged. In this way, a life cycle of a power device in the power system can be extended, and reliability of the power system can be improved.

When the sum of the maximum discharge power of the energy units in the N direct current coupling units is greater than the required power of the load, the primary controller may further determine whether the sum of the maximum discharge power of the energy units in the N direct current coupling units is greater than a sum of the required power of the load and required charging power of the energy storage units. The required charging power $P_{bat\_charge\_lmt\_sum}$ of the energy storage units may be a sum of charging power limits of the energy units in the direct current coupling units, and may be expressed by using the following formula:

$$P_{bat\_charge\_lmt\_sum} = \sum P_{bat\_charge\_lmt\_i} \qquad (9)$$

If the sum of the maximum discharge power of the energy units in the N direct current coupling units is not greater than the sum of the required power of the load and the required charging power of the energy storage units, the energy units in the N direct current coupling units need to be discharged to provide electric energy to the load, and electric energy may be further provided to the energy storage unit.

FIG. 8 is a schematic diagram of a method 700 for allocating charging power to an energy storage unit in a power system according to an embodiment of this application. It should be understood that, that a sum of maximum discharge power of energy units in N direct current coupling units is greater than required power of a load, and is not greater than a sum of the required power of the load and required charging power of energy storage units is merely an application scenario of the method. The method may further be applied to another scenario in which charging power needs to be allocated to the energy storage unit, for example, a scenario in which a power grid is scheduled to provide electric energy to the energy storage unit. The method includes at least the following several steps.

S710: A primary controller determines an expected charging power value of energy storage units in the N direct current coupling units.

When the sum of the maximum discharge power of the energy units in the N direct current coupling units is greater than the required power of the load, and is not greater than the sum of the required power of the load and the required charging power of the energy storage units, the expected charging power value $P_{bat\_charge\_sum}$ of the energy storage units in the N direct current coupling units is a difference between the sum of the maximum discharge power of the energy units in the N direct current coupling units and power output by the energy units in the N direct current coupling units to the load. That is, the expected charging power value of the energy storage units in the N direct current coupling units may be expressed as follows:

$$P_{bat\_charge\_sum} = P_{pv\_sum} - \sum P_{pv\_to\_load\_i} \qquad (10)$$

S720: The primary controller determines theoretical charging power of an energy storage unit in each direct current coupling unit based on the expected charging power value of the energy storage units in the N direct current coupling units and first characteristic information of the energy storage unit in each direct current coupling unit, where the first characteristic information indicates a real-time charging/discharging capability of the energy storage unit in the direct current coupling unit.

The theoretical charging power may be understood as charging power that can be provided by the energy storage unit in each direct current coupling unit.

In a possible implementation, theoretical charging power $P_{bat\_charge\_1\_i}$ of an energy storage unit in an $i^{th}$ direct current coupling unit in the N direct current coupling units may be determined based on the following formula:

$$P_{bat\_charge\_1\_i} = P_{bat\_charge\_sum} \frac{(1 - SOC_i), SOH_i, CAPACITY_i}{\sum_{i=1}^{n}(1 - SOC_i), SOH_i, CAPACITY_i}, \qquad (11)$$

where $P_{bat\_charge\_sum}$ represents the expected charging power value of the energy storage units in the N direct current coupling units, and $SOC_i$, $SOH_i$, and $CAPACITY_i$ respectively represent a SOC, a SOH, and a capacity of an energy storage battery in the $i^{th}$ direct current coupling unit.

S730: The primary controller obtains a charging power limit of the energy storage unit in each direct current coupling unit.

The charging power limit $P_{bat\_charge\_lmt\_i}$ of the energy storage unit may be understood as a maximum value of power that can be input to the energy storage unit.

S740: The primary controller determines actual charging power of the energy storage unit in each direct current coupling unit based on the theoretical charging power of the energy storage unit in each direct current coupling unit and the charging power limit of the energy storage unit in each direct current coupling unit.

The actual charging power of the energy storage unit in each direct current coupling unit may be understood as actual charging power allocated to the energy storage unit.

In a possible implementation, the primary controller determines a smallest value in the following items as the actual charging power $P_{bat\_charge\_2\_i}$ of the energy storage unit in each direct current coupling unit: the theoretical charging power of the energy storage unit in each direct current coupling unit and the charging power limit of the energy storage unit in each direct current coupling unit. This may be expressed as follows:

$$P_{bat\_charge\_2\_i} = \min\left(P_{bat_{charge_{1_i}}}, P_{bat\_charge\_lmt\_i}\right) \quad (12)$$

In another possible implementation, power is input to the energy storage unit through an inverter unit, and the inverter unit has borne output power provided by the energy unit to the load. Therefore, when charging power is allocated to the energy storage unit, output power allocated to the energy unit needs to be considered. That is, actual charging power $P_{bat\_charge\_2\_i}$ of the energy storage unit in the $i^{th}$ direct current coupling unit may be expressed as follows:

$$P_{bat\_charge\_2\_i} = \min(P_{bat\_charge\_1\_i}, P_{bat\_charge\_lmt\_i}, P_{inv\_lmt\_i} + P_{pv\_to\_load\_i}) \quad (13),$$

where $P_{bat\_charge\_1\_i}$ represents the theoretical charging power of the energy storage unit in the $i^{th}$ direct current coupling unit, $P_{bat\_charge\_lmt\_i}$ represents a charging power limit of the energy storage unit in the $i^{th}$ direct current coupling unit, and $P_{inv\_lmt\_i} + P_{pv\_to\_load\_i}$ represents a limit of power (an example of a second power value) that can be output after the inverter unit bears the power output by the energy unit to the load.

It is assumed that it is determined, based on the formula (11), to allocate actual charging power to energy storage units in M of the N direct current coupling units, where M is a positive integer, and M≤N, and amplitude limiting is performed on the actual charging power of the M direct current coupling units in an amplitude limiting manner shown in the formula (12). In a possible implementation, a manner of determining the actual charging power of the energy storage unit in each direct current coupling unit in step S740 is described with reference to steps S741 to S744 in FIG. 9.

S741: The primary controller allocates actual charging power to an energy storage unit in a first direct current coupling unit.

The first direct current coupling unit is a direct current coupling unit whose theoretical charging power is greater than or equal to a charging power limit corresponding to the direct current coupling unit in the M direct current coupling units. The primary controller determines that there are N1 first direct current coupling units in the M direct current coupling units, where N1 is a positive integer, and 0≤N1≤M.

S742: The primary controller determines power allocation for the first direct current coupling unit.

When N1=M, S743 is performed, and the primary controller determines to allocate charging power limits corresponding to the N1 first direct current coupling units to the N1 first direct current coupling units as actual discharge power of the N1 first direct current coupling units, and ends iterative calculation of allocation of the actual charging power.

In this case, charging power limits corresponding to all energy storage units in the M first direct current coupling units are allocated to the energy storage units as actual charging power.

When N1=0, in S744, the primary controller determines that actual charging power of the M first direct current coupling units is theoretical charging power, and ends iterative calculation.

In this case, none of the N1 first direct current coupling units is in an amplitude limiting state, and all power that needs to be provided by the energy storage unit to the load is allocated.

When 0<N1<M, in S745, the primary controller determines that actual charging power of energy storage units in the N1 first direct current coupling units is charging power limits of the energy storage units in the N1 first direct current coupling units, and re-determines actual charging power of an energy storage unit in a second direct current coupling unit.

It may be understood that the second direct current coupling unit includes a direct current coupling unit to which no actual charging power is allocated in the M direct current coupling units. The re-determining actual charging power of an energy storage unit in a second direct current coupling unit is performing S710 again to perform iterative calculation. In this case, the expected charging power value of the energy storage units in the N direct current coupling units is a difference between $P_{bat\_charge\_sum}$ and a sum of the actual charging power of the energy storage units in the $N_1$ first direct current coupling units.

The foregoing steps are repeated until allocation of $P_{bat\_charge\_sum}$ is completed, or the actual charging power allocated to the energy storage units in the M direct current coupling units reaches the charging power limits corresponding to the energy storage units.

Optionally, the method may further include S750: Determine a power reference value $P_{inv\_ref\_i}$ of an inverter unit in each direct current coupling unit. The power reference value may be understood as an output power value of the inverter unit. $P_{inv\_ref\_i}$ may be expressed by using the following formula:

$$P_{inv\_ref\_i} = \quad (14)$$
$$P_{pv\_to\_load\_i} - P_{bat_{charge_{2_i}}} + \left(P_{pv_i} - P_{pv\_to\_load\_i}\right) = P_{pv\_i} - P_{bat\_charge\_2\_i}$$

The energy unit and the energy storage unit output power or power is input to the energy unit and the energy storage unit through the inverter unit. Therefore, the power reference value may represent total output power allocated by the primary controller to the direct current coupling unit.

Therefore, in this application, charging power is provided to the energy storage unit in each direct current coupling unit through even allocation based on the formula (11), and the actual charging power is allocated to each direct current coupling unit with reference to the real-time charging capability of the energy storage units in each direct current coupling unit, to avoid a case in which the energy storage battery is overcharged. In this way, a life cycle of a power device in the power system can be extended.

When the sum of the maximum discharge power of the energy units in the N direct current coupling units is greater than the sum of the required power of the load and the required charging power of the energy storage units, that is, when the energy units in the N direct current coupling units have remaining power in addition to providing electric energy to the load and the energy storage units, the energy units in the N direct current coupling units may be further configured to supply power to the power grid. FIG. 10 shows another method 800 for allocating output power to an energy unit according to an embodiment of this application. The method includes at least the following several steps.

S810: A primary controller determines actual charging power allocated to an energy storage unit in each direct current coupling unit.

In this case, in addition to providing electric energy to a load and energy storage units, energy units in N direct current coupling units have remaining power. Therefore, actual charging power $P_{bat\_charge\_2\_i}$ allocated to each energy storage unit may reach a charging power limit $P_{bat\_charge\_lmt\_i}$ of each energy storage unit, that is, the actual charging power allocated by the primary controller to the energy storage unit in each direct current coupling unit is a charging power limit of the energy storage unit.

S820: The primary controller determines remaining power of an energy unit in each direct current coupling unit.

It should be understood that the remaining power may represent power remaining after the energy unit in each direct current coupling unit provides electric energy to the load and the energy storage unit. That is, the remaining power may be expressed as follows:

$$P_{rest\_i} = P_{pv\_i} - P_{bat\_charge\_2\_i} - P_{pv\_to\_load\_i} \quad (15)$$

It should be noted that a sum of maximum discharge power of the energy units in the N direct current coupling units is greater than a sum of required power of the load and required charging power of the energy storage units, and maximum discharge power of an energy unit in one of the direct current coupling units may be less than or equal to a sum of power provided to the load and a charging power limit of an energy storage unit, that is, remaining power of the one of the direct current coupling units may be negative or 0.

S830: The primary controller determines remaining power of N1 first direct current coupling units.

Further, the N1 direct current coupling units are direct current coupling units, in the N direct current coupling units, that include an energy unit whose maximum discharge power is less than or equal to a sum of charging power provided to the load and an energy storage unit, where 0≤N1<N.

S840: The primary controller determines power allocation based on the N1 direct current coupling units.

If N1=0, that is, maximum discharge power of the energy unit in each of the N direct current coupling units is greater than a sum of power provided to the load and the energy storage unit, S841 is performed.

S841: The primary controller determines a surplus power on-grid capability reference value of a second direct current coupling unit.

The second direct current coupling unit includes a direct current coupling unit, in the N direct current coupling units, that includes an energy unit whose maximum discharge power is greater than a sum of charging power provided to the load and an energy storage unit. When N1=0, the second direct current coupling unit includes the N direct current coupling units. The surplus power on-grid capability reference value may be represented by power that can be output by the second direct current coupling unit to a power grid. Alternatively, the surplus power on-grid capability reference value may be represented by an amplitude limiting value of remaining power to be provided by the second direct current coupling unit to a power grid.

In a possible implementation, the primary controller determines a smallest value in the following items as the surplus power on-grid capability reference value of the second direct current coupling unit: the remaining power of each direct current coupling unit and power that can be output by an inverter unit in each direct current coupling unit. It may be understood that the energy unit outputs power through the inverter unit, and the inverter unit has borne output power provided by the energy unit to the load. Therefore, when the surplus power on-grid capability reference value of the direct current coupling unit is determined, the output power provided to the load needs to be considered. This may be expressed as follows:

$$P_{on\_grid\_i} = \min(P_{rest\_i}, P_{inv\_lmt\_i} - P_{pv\_to\_load\_i}) \quad (16)$$

After the surplus power on-grid capability reference value of the second direct current coupling unit is determined, S850 is performed to determine a surplus power on-grid power reference value of each second direct current coupling unit.

The surplus power on-grid power reference value may be determined based on a surplus power on-grid power limit. The surplus power on-grid power limit may be understood as a limit of on-grid power that can be received by the power grid, or surplus power on-grid power of each direct current coupling unit is limited by the surplus power on-grid power limit.

The surplus power on-grid power reference value $P_{on\_grid\_ref\_i}$ of each direct current coupling unit may be expressed as follows:

$$P_{on\_grid\_ref\_i} = \min\left(P_{on\_grid\_lmt} \frac{P_{on\_grid\_i}}{\sum_j P_{on\_grid\_i}}, P_{on\_grid\_i}\right), \quad (17)$$

where $P_{on\_grid\_lmt}$ represents the surplus power on-grid power limit, and $\Sigma P_{on\_grid\_i}$ represents total power that can be output by the second direct current coupling unit to the power grid.

If 0<N1<N, S842 is performed.

S842: Determine power to be output by N2 second direct current coupling units to the N1 first direct current coupling units.

The N2 second direct current coupling units are direct current coupling units whose value of remaining power is greater than 0, that is, in addition to providing electric energy to the load and energy storage units, energy units in the second direct current coupling units have remaining power, where 0<N2<N. In this case, it may be considered to charge energy storage units in the N1 first direct current coupling units, that is, remaining power of the second direct current coupling units is preferentially used to charge the energy storage units in the first direct current coupling units, and then power is supplied to a power grid.

A value of the remaining power of the $N_1$ first direct current coupling units is denoted as $P_{rest\_neg\_i}$, $P_{rest\_neg\_i}=|P_{rest\_i}|$, the value of the remaining power of the $N_2$ second direct current coupling units is denoted as $P_{rest\_pos\_i}$, and power to be output by each of the $N_2$ second direct current coupling units to the $N_1$ first direct current coupling units may be expressed as follows:

$$P_{pv\_to\_other\_bat\_i} = \sum_{i=0}^{N1} P_{rest\_neg\_i} \frac{P_{rest\_pos\_i}}{\sum_{i=1}^{N2} P_{rest\_pos\_i}}, \quad (18)$$

where $\Sigma_{i=1}^{N2} P_{rest\_pos\_i}$ represents a sum of the remaining power of the $N_2$ second direct current coupling units, and $\Sigma_{i=0}^{N1} P_{rest\_neg\_i}$ represents a sum of required charging power of the $N_1$ first direct current coupling units. The power to be output by the $N_2$ second direct current coupling units to the first direct current coupling units may be provided through even allocation based on the formula (18).

After the power to be output by the N2 second direct current coupling units to the N1 first direct current coupling units is determined, S841 is performed again to perform calculation again, that is, surplus power on-grid capability reference values of the N2 second direct current coupling units are determined.

In this case, the energy unit in the N2 second direct current coupling units outputs power through an inverter unit, and the inverter unit has borne output power provided by the energy unit to the load and the power output to the N1 first direct current coupling units. Therefore, when the surplus power on-grid capability reference values of the N2 second direct current coupling units are determined, the output power provided to the load and the power output to the N1 first direct current coupling units need to be considered. That is, another possible implementation of determining the surplus power on-grid capability reference value of the second direct current coupling unit in S841 is that the primary controller determines a smallest value in the following items as the surplus power on-grid capability reference value of the second direct current coupling unit: the remaining power of each direct current coupling unit and power that can be output by an inverter unit in each direct current coupling unit. This may be expressed as follows:

$$P_{on\_grid\_i} = \min(P_{rest\_i} - P_{pv\_to\_other\_bat\_i}, \quad P_{inv\_lmt\_i} - P_{pv\_to\_load\_i} - P_{pv\_to\_other\_bat\_i}) \quad (19)$$

Therefore, in this application, the primary controller in a power system may obtain current remaining power of the energy unit in the direct current coupling unit, and the primary controller provides the surplus power on-grid power reference value to each direct current coupling unit through even allocation based on an output limit of the inverter unit and the surplus power on-grid power limit, so that the inverter unit in the power system can equalize power output, to extend a life cycle of a power device in the inverter unit.

Figure 11:
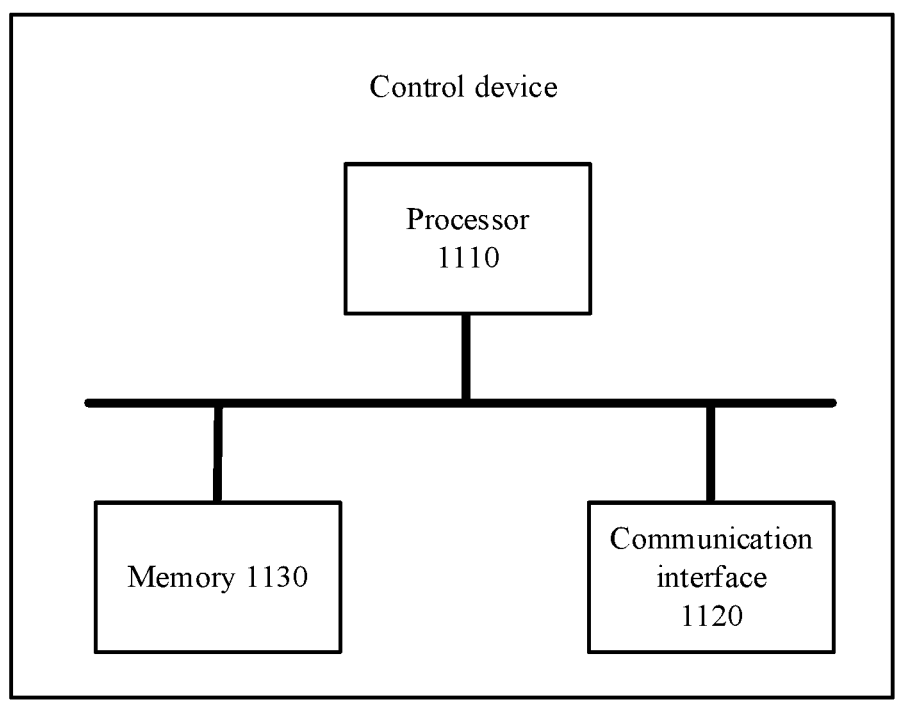
FIG. 11 is a schematic diagram of a structure of a control device applicable to this application.

FIG. 11 is a schematic diagram of a structure of a control device according to an embodiment of this application. The control device includes a processor 1110 and a communication interface 1120. Optionally, the control device may further include a memory 1130. Optionally, the memory 1130 may be included in the processor 1110. The processor 1110, the communication interface 1120, and the memory 1130 communicate with each other by using an internal connection path. The memory 1130 is configured to store instructions. The processor 1110 is configured to execute the instructions stored in the memory 1130, to implement the control method provided in embodiments of this application.

Optionally, the control device may be configured to perform functions of the primary controller 110 in FIG. 1, functions of the photovoltaic controllers 240 to 260 in FIG. 2, or functions of the energy storage controllers 340 to 360 in FIG. 3.

Optionally, the control device may be further configured to perform the control method shown in either FIG. 5 or FIG. 8.

The terms such as "component", "module", and "system" used in this specification represent computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that the example units, algorithms, and steps described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for convenient and brief description, for detailed working processes of the system, apparatus, and unit described above, refer to the corresponding processes in the foregoing method embodiments. Details are not described herein.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, for example, a Universal Serial Bus (USB) flash drive, a removable hard disk, a ROM, a random-access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power system, comprising:
   N direct current coupling systems configured to provide first electric energy to a load, wherein the N direct current coupling systems comprises energy storage systems configured to store second electric energy or provide the second electric energy to the load, and wherein N is a positive integer; and
   a primary controller coupled to the N direct current coupling systems and configured to:
   determine expected discharge power values of the energy storage systems in the N direct current coupling systems, wherein the expected discharge power values indicate power to be discharged by the energy storage system;
   determine actual discharge power of each of the energy storage systems in the N direct current coupling systems based on the expected discharge power values and first characteristic information of each of the energy storage systems, wherein the first characteristic information indicates a real-time charging/discharging capability of each of the energy storage systems, and wherein the actual discharge power is allocated to each of the energy storage systems.

2. The power system of claim 1, wherein the first characteristic information comprises at least one of:
   a state of charge (SOC) of an energy storage battery in each of the energy storage unit, systems;
   a state of health (SOH) of the energy storage battery; or
   a capacity of the energy storage battery.

3. The power system of claim 1, wherein the primary controller is further configured to:
   determine theoretical discharge power of each of the energy storage systems based on the expected discharge power values and the first characteristic information;
   obtain a discharge power limit of each of the direct current coupling systems, wherein the discharge power limit of power output by each of the energy storage systems; and
   determine the actual discharge power of each of the direct current coupling systems based on the theoretical discharge power and the discharge power limit.

4. The power system of claim 3, wherein the primary controller is further configured to determine the theoretical discharge power based on a formula, wherein the formula is:

$$P\_(bat\_(discharge\_(1\_i))) = P\_(bat\_(discharge\_sum)) \cdot ((1 - SOC\_i) \cdot SOH\_i \cdot CAPACITY\_i) / \left( \sum (1 - SOC\_i) \cdot SOH\_i \cdot CAPACITY\_i \right),$$

wherein P_(bat_(discharge_(1_i))) represents an $i^{th}$ theoretical discharging power of an $i^{th}$ energy storage system in an $i^{th}$ direct current coupling system in the N direct current coupling systems, wherein P_(bat_(discharge_sum)) represents the expected discharge power value, wherein SOC_i represents a state of charge (SOC) of an energy storage battery in the $i^{th}$ energy storage system, wherein SOH_i represents a state of health (SOH) of the energy storage battery, wherein CAPACITY_i represents a capacity of the energy storage battery, and wherein $1 \leq i \leq N$.

5. The power system of claim 3, wherein each of the N direct current coupling systems further comprises an inverter system configured to:
   receive, through a direct current bus, the second electric energy;
   perform direct current (DC)-to-alternating current (AC) conversion on the second electric energy to obtain third electric energy; and
   provide the third electric energy to the load,
   wherein the primary controller is further configured to:
   determine a smallest value in the following parameters as the actual discharge power:
   the theoretical discharge power;
   the discharge power limit; and
   a first power value of the direct current coupling systems, wherein the first power value is a maximum value of power that can be output by the inverter system.

6. The power system of claim 3, wherein the primary controller is further configured to:
   allocate a second theoretical discharge power to M direct current coupling systems of the N direct current coupling systems, wherein the M direct current coupling systems are at least some of the N direct current coupling systems; and
   perform rounds of iterative calculation to determine a second actual discharge power of each of the M direct current coupling systems, wherein each of the rounds of iterative calculation comprises:
   determining $N_1$ direct current coupling systems of the M direct coupling systems, wherein each of the $N_1$ direct current coupling systems has a third theoretical discharge power greater than a second discharge power limit in the M direct current coupling systems, wherein $N_1$ is a positive integer, and wherein $0 < N_1 \leq M$;
   determining that third discharge power limits of the $N_1$ direct current coupling systems are fourth actual discharge powers of the $N_1$ direct current coupling systems;
   determining that the expected discharge power value of is decreased by a sum of fifth actual discharge powers of fourth energy storage systems in the $N_1$ direct current coupling systems; and
   determining to allocate a sixth actual discharge power to a fifth energy storage unit in system in a second direct current coupling system that is in the M direct current coupling systems and that does not comprise the actual discharge power allocated to.

7. The power system of claim 6, wherein the primary controller is further configured to:
   determine that the second theoretical discharge power is less than second discharge power limits corresponding to the M direct current coupling systems; and
   determine that third actual discharge powers of the M direct current coupling systems is the second theoretical discharge power.

8. The power system of claim 1, wherein each of the N direct current coupling systems further comprises an energy system configured to generate the second electric energy, and wherein the primary controller is further configured to:
   determine that a sum of maximum discharge power of energy units systems in the N direct current coupling systems is less than a power of the load; and
   determine to allocate the expected discharge power value to the energy storage systems.

9. A power system comprising:
   N direct current coupling systems configured to provide first electric energy to a load, wherein the N direct current coupling systems comprises energy storage systems configured to store second electric energy, and wherein N is a positive integer; and
   a primary controller coupled to the N direct current coupling systems and configured to:
      determine expected charging power values of the energy storage systems in the N direct current coupling systems, wherein the expected charging power values are configured to be provided to the energy storage systems; and
      determine actual charging power of each of the energy storage systems the N direct current coupling systems based on the expected charging power value and first characteristic information of each of the energy storage systems, wherein the first characteristic information indicates a real-time charging/discharging capability of each of the energy storage systems, and wherein the actual charging power is allocated to each of the energy storage systems.

10. The power system of claim 9, wherein the first characteristic information comprises at least one of:
    a state of charge (SOC) of an energy storage battery in each of the energy storage unit, systems;
    a state of health (SOH) of the energy storage battery; or
    a capacity of the energy storage battery.

11. The power system of claim 9, wherein the primary controller is further configured to:
    determine theoretical charging power of each of the energy storage systems based on the expected charging power value and the first characteristic information;
    obtain a charging power limit of each of the N direct current coupling systems, wherein the charging power limit is a limit of power that can be input to each of the energy storage systems; and
    determine actual charging power of each of the N direct current coupling systems based on the theoretical charging power and the charging power limit.

12. The power system of claim 11, wherein the primary controller is further configured to determine the theoretical charging power based on a formula, wherein the formula is:

$$P\_(bat\_(charge\_(1\_i)\,)\,) = P\_(bat\_(charge\_sum))\,((1 - \text{SOC}\_i) \cdot \text{SOH}\_i \cdot \text{CAPACITY}\_i) / \left( \sum (1 - \text{SOC}\_i) \cdot \text{SOH}\_i \cdot \text{CAPACITY}\_i \right),$$

wherein P_(bat_(charge_(1_i))) represents an $i^{th}$ theoretical charging power of an $i^{th}$ energy storage system in an $i^{th}$ direct current coupling system in the N direct current coupling units systems, wherein P_(bat_(charge_sum)) represents the expected charging power value, wherein SOC_i represents a state of charge (SOC) of an energy storage battery in the $i^{th}$ energy storage system, wherein SOH_i represents a state of health (SOH) of the energy storage battery, wherein CAPACITY_i represents a capacity of the energy storage battery, and wherein $1 \leq i \leq N$.

13. The power system of claim 9, wherein each of the N direct current coupling systems further comprises an energy system configured to generate the second electric energy, and wherein the primary controller is further configured to:
    determine that a first sum of maximum discharge power of energy systems in the N direct current coupling units systems is greater than a power of the load and is less than a second sum of the power of the load and charging powers of the energy storage systems; and
    determine to allocate the expected charging power value to the energy storage systems.

14. A power system comprising:
    N direct current coupling systems configured to supply power to a load and a power grid, wherein each of the N direct current coupling systems comprises:
       an energy system configured to generate first electric energy;
       a direct current bus;
       an energy storage system coupled to the energy system and configured to store the first electric energy; and
       an inverter system coupled to the energy system and configured to:
          receive, through the direct current bus, the first electric energy;
          perform direct current (DC)-to-alternating current (AC) conversion on the first electric energy to obtain a second electric energy; and
          provide the second electric energy to the load and the power grid,
       wherein N is a positive integer; and
    a primary controller coupled to the N direct current coupling systems and configured to:
       determine a remaining power of the energy system, wherein the remaining power is after a corresponding direct current coupling system provides a third electric energy to the energy storage system and the load;
       obtain an output power limit of each of the N direct current coupling systems, wherein the output power limit is power that can be output by the inverter system; and
       determine a surplus power on-grid power reference value of each of the N direct current coupling systems based on the remaining power and the output power limit, wherein surplus power on-grid power is allocated by the energy system and is to be provided to the power grid.

15. The power system of claim 14, wherein the primary controller is further configured to:
    determine a surplus power on-grid capability reference value of each of the N direct current coupling systems based on the remaining power and the output power limit, wherein the surplus power on-grid capability reference value indicates a maximum value of power that can be output by the corresponding direct current coupling system to the power grid; and
    further determine the surplus power on-grid power reference value based on the surplus power on-grid capability reference value and a second limit of power that can be received by the power grid.

16. The power system of claim 15, wherein the primary controller is further configured to determine a smallest value in parameters as the surplus power on-grid capability reference value, and wherein the parameters are:
    the remaining power; and
    the output power limit.

17. The power system of claim 15, wherein the primary controller is further configured to determine the surplus power on-grid power reference value based on a formula, and wherein the formula is:

$$P\_(on\_(grid\_(ref\_i))) = \min(P\_(on\_(grid\_lmt)) \ P\_(on\_(grid\_i))/(\sum P\_(on\_(grid\_i))), P\_(on\_(grid\_i))),$$

wherein $P\_(on\_(grid\_(ref\_i)))$ represents the surplus power on-grid power reference value of an $i^{th}$ direct current coupling system in the N direct current coupling systems, wherein $P\_(on\_(grid\_i))$ represents the surplus power on-grid capability reference value, wherein $P\_(on\_(grid\_lmt))$ represents the second limit of power, wherein $\sum P\_(on\_(grid\_i))$ represents a sum of surplus power on-grid capability reference values of the N direct current coupling systems, and wherein $1 \leq i \leq N$.

18. The power system of claim 14, wherein the primary controller is further configured to:
    determine that maximum discharge powers of energy systems in the N direct current coupling systems are greater than a sum of power of the load and charging power of energy storage systems in the N direct current coupling systems; and
    determine that an actual charging power allocated to the energy storage system is a charging power limit of the energy storage system.

19. The power system of claim 18, wherein the primary controller is further configured to:
    determine power output by the energy system to the load; and
    determine that power remaining after the energy system outputs the actual charging power to the energy storage system and outputs the power to the load is the remaining power.

20. The power system of claim 18, wherein the primary controller is further configured to:
    determine a second remaining power of a second direct current coupling system in the N direct current coupling systems, wherein the second remaining power is greater than 0 after the energy system outputs power to the energy storage system and the load; and
    determine that the second remaining power is power remaining after the energy system outputs power to the energy storage system, the load, and a direct current coupling system in the N direct current coupling systems, wherein the direct current coupling system comprises a third remaining power that is less than 0 after the energy system outputs power to the energy storage system and the load.

* * * * *